United States Patent
Lin et al.

(10) Patent No.: US 9,871,451 B2
(45) Date of Patent: Jan. 16, 2018

(54) SYSTEMS AND METHODS FOR VOLTAGE CONTROL AND CURRENT CONTROL OF POWER CONVERSION SYSTEMS WITH MULTIPLE OPERATION MODES

(71) Applicant: ON-BRIGHT ELECTRONICS (SHANGHAI) CO., LTD., Shanghai (CN)

(72) Inventors: Yuan Lin, Shanghai (CN); Xiaomin Huang, Shanghai (CN); Qiang Luo, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 718 days.

(21) Appl. No.: 13/646,268

(22) Filed: Oct. 5, 2012

(65) Prior Publication Data

US 2014/0078790 A1 Mar. 20, 2014

(30) Foreign Application Priority Data

Sep. 14, 2012 (CN) .......................... 2012 1 0342097

(51) Int. Cl.
*H02M 3/335* (2006.01)
*H02M 1/00* (2006.01)

(52) U.S. Cl.
CPC ....... *H02M 3/33507* (2013.01); *H02M 3/335* (2013.01); *H02M 2001/0032* (2013.01); *Y02B 70/16* (2013.01)

(58) Field of Classification Search
CPC .................................................... H02M 3/335
See application file for complete search history.

(56) References Cited

U.S. PATENT DOCUMENTS 3,912,340 A   10/1975   Bertolasi
5,247,241 A    9/1993   Ueda
(Continued)

FOREIGN PATENT DOCUMENTS

CN   1841893 A   10/2006
CN   1917322 A    2/2007
(Continued)

OTHER PUBLICATIONS

U.S. Notice of Allowance dated Jan. 20, 2015, in U.S. Appl. No. 12/859,138.
(Continued)

*Primary Examiner* — Timothy J Dole
*Assistant Examiner* — Ishrat Jamali
(74) *Attorney, Agent, or Firm* — Jones Day

(57) ABSTRACT

System and method for regulating a power conversion system. A system controller for regulating a power conversion system includes an operation-mode-selection component and a driving component. The operation-mode-selection component is configured to receive a first signal related to an output load of the power conversion system and a second signal related to an input signal received by the power conversion system and output a mode-selection signal based on at least information associated with the first signal and the second signal. The driving component is configured to receive the mode-selection signal and generate a drive signal based on at least information associated with the mode-selection signal, the driving signal corresponding to a switching frequency.

15 Claims, 16 Drawing Sheets

(56) References Cited

U.S. PATENT DOCUMENTS

| | | | |
|---|---|---|---|
| 5,497,119 A | 3/1996 | Tedrow et al. |
| 5,568,044 A | 10/1996 | Bittner |
| 5,729,448 A | 3/1998 | Haynie et al. |
| 6,134,060 A | 10/2000 | Ryat |
| 6,292,376 B1 | 9/2001 | Kato |
| 6,366,066 B1 | 4/2002 | Wilcox |
| 6,366,070 B1 | 4/2002 | Cooke et al. |
| 6,381,151 B1 | 4/2002 | Jang |
| 6,545,513 B2 | 4/2003 | Tsuchida et al. |
| 6,556,478 B2 | 4/2003 | Willis et al. |
| 6,713,995 B2 | 3/2004 | Chen |
| 6,798,086 B2 | 9/2004 | Utsunomiya |
| 6,947,298 B2 | 9/2005 | Uchida |
| 6,954,056 B2 | 10/2005 | Hoshino et al. |
| 6,972,528 B2 | 12/2005 | Shao |
| 6,972,548 B2 | 12/2005 | Tzeng et al. |
| 6,977,824 B1 | 12/2005 | Yang et al. |
| 7,035,119 B2 | 4/2006 | Koike |
| 7,054,169 B2 | 5/2006 | Huh et al. |
| 7,116,089 B1 | 10/2006 | Nguyen et al. |
| 7,173,404 B2 | 2/2007 | Wu |
| 7,208,927 B1 | 4/2007 | Nguyen |
| 7,262,587 B2 | 8/2007 | Takimoto et al. |
| 7,265,999 B2 | 9/2007 | Murata et al. |
| 7,345,895 B2 | 3/2008 | Zhu et al. |
| 7,394,634 B2 | 7/2008 | Fang et al. |
| 7,414,865 B2 | 8/2008 | Yang |
| 7,456,623 B2 | 11/2008 | Hasegawa et al. |
| 7,492,619 B2 | 2/2009 | Ye et al. |
| 7,522,431 B2 | 4/2009 | Huynh et al. |
| 7,605,576 B2 | 10/2009 | Kanakubo |
| 7,609,039 B2 | 10/2009 | Hasegawa |
| 7,684,220 B2 | 3/2010 | Fang et al. |
| 7,684,462 B2 | 3/2010 | Ye et al. |
| 7,826,237 B2 | 11/2010 | Zhang et al. |
| 7,852,055 B2 | 12/2010 | Michishita |
| 7,898,825 B2 | 3/2011 | Mulligan et al. |
| 7,990,202 B2 | 8/2011 | Fang et al. |
| 8,085,027 B2 | 12/2011 | Lin et al. |
| 8,213,203 B2 | 7/2012 | Fei et al. |
| 8,305,776 B2 | 11/2012 | Fang |
| 8,331,112 B2 | 12/2012 | Huang et al. |
| 8,339,814 B2 | 12/2012 | Zhang et al. |
| 8,391,028 B2 | 3/2013 | Yeh |
| 8,488,342 B2 | 7/2013 | Zhang et al. |
| 8,526,203 B2 | 9/2013 | Huang et al. |
| 8,879,289 B2 | 11/2014 | Lin et al. |
| 8,891,256 B2 | 11/2014 | Fang et al. |
| 8,971,062 B2 | 3/2015 | Huang et al. |
| 8,982,585 B2 | 3/2015 | Fang |
| 9,088,217 B2 | 7/2015 | Zhang et al. |
| 9,325,234 B2 | 4/2016 | Zhang et al. |
| 9,350,252 B2 | 5/2016 | Zhang et al. |
| 9,379,623 B2 | 6/2016 | Zhang et al. |
| 9,379,624 B2 | 6/2016 | Lin et al. |
| 9,385,612 B2 | 7/2016 | Zhang et al. |
| 9,559,598 B2 | 1/2017 | Fang et al. |
| 9,577,537 B2 | 2/2017 | Zhang et al. |
| 2002/0080625 A1 | 6/2002 | Goyhenetche et al. |
| 2002/0080631 A1 | 6/2002 | Kanouda et al. |
| 2003/0174520 A1 | 9/2003 | Bimbaud |
| 2004/0075600 A1 | 4/2004 | Vera et al. |
| 2005/0057238 A1 | 3/2005 | Yoshida |
| 2005/0116697 A1 | 6/2005 | Matsuo et al. |
| 2005/0222646 A1 | 10/2005 | Kroll et al. |
| 2005/0270807 A1 | 12/2005 | Strijker |
| 2006/0034102 A1 | 2/2006 | Yang et al. |
| 2006/0043953 A1 | 3/2006 | Xu |
| 2006/0050539 A1 | 3/2006 | Yang et al. |
| 2006/0055433 A1 | 3/2006 | Yang et al. |
| 2006/0273772 A1 | 12/2006 | Groom |
| 2007/0115696 A1 | 5/2007 | Berghegger |
| 2007/0171687 A1 | 7/2007 | Kogel et al. |
| 2007/0241733 A1 | 10/2007 | Chen et al. |
| 2007/0273345 A1 | 11/2007 | Chen et al. |
| 2008/0061754 A1 | 3/2008 | Hibi |
| 2008/0112193 A1 | 5/2008 | Yan et al. |
| 2008/0157742 A1 | 7/2008 | Martin et al. |
| 2008/0159378 A1 | 7/2008 | Kris |
| 2008/0225563 A1 | 9/2008 | Seo |
| 2008/0252345 A1 | 10/2008 | Deschamp et al. |
| 2009/0051336 A1 | 2/2009 | Hartlieb et al. |
| 2009/0058387 A1 | 3/2009 | Huynh et al. |
| 2009/0073727 A1 | 3/2009 | Huynh et al. |
| 2009/0121697 A1 | 5/2009 | Aiura et al. |
| 2009/0141520 A1 | 6/2009 | Grande et al. |
| 2009/0175057 A1 | 7/2009 | Grande et al. |
| 2009/0206814 A1 | 8/2009 | Zhang et al. |
| 2009/0219000 A1 | 9/2009 | Yang |
| 2009/0251219 A1 | 10/2009 | Fiocchi et al. |
| 2009/0302817 A1 | 12/2009 | Nagai |
| 2010/0026270 A1 | 2/2010 | Yang et al. |
| 2010/0061126 A1 | 3/2010 | Huynh et al. |
| 2010/0128501 A1 | 5/2010 | Huang et al. |
| 2010/0141178 A1 | 6/2010 | Negrete et al. |
| 2010/0219802 A1* | 9/2010 | Lin et al. ............... 323/284 |
| 2010/0225293 A1 | 9/2010 | Wang et al. |
| 2011/0044076 A1 | 2/2011 | Zhang et al. |
| 2011/0096574 A1 | 4/2011 | Huang |
| 2011/0149614 A1 | 6/2011 | Stracquadaini |
| 2011/0182089 A1 | 7/2011 | Genannt Berghegger |
| 2011/0248770 A1 | 10/2011 | Fang et al. |
| 2011/0267853 A1 | 11/2011 | Yang et al. |
| 2012/0013321 A1 | 1/2012 | Huang et al. |
| 2012/0075891 A1 | 3/2012 | Zhang et al. |
| 2012/0139435 A1 | 6/2012 | Storm |
| 2012/0147630 A1 | 6/2012 | Cao et al. |
| 2012/0153919 A1* | 6/2012 | Garbossa et al. ......... 323/284 |
| 2012/0195076 A1 | 8/2012 | Zhang et al. |
| 2012/0224397 A1* | 9/2012 | Yeh ..................... 363/21.12 |
| 2012/0257423 A1 | 10/2012 | Fang |
| 2012/0281438 A1 | 11/2012 | Fang et al. |
| 2012/0300508 A1 | 11/2012 | Fang |
| 2012/0320640 A1 | 12/2012 | Baurle et al. |
| 2013/0027989 A1 | 1/2013 | Fang |
| 2013/0033905 A1 | 2/2013 | Lin et al. |
| 2013/0051090 A1 | 2/2013 | Xie et al. |
| 2013/0182476 A1 | 7/2013 | Yang et al. |
| 2013/0223107 A1 | 8/2013 | Zhang et al. |
| 2013/0272033 A1 | 10/2013 | Zhang et al. |
| 2013/0308350 A1 | 11/2013 | Huang et al. |
| 2014/0160809 A1 | 6/2014 | Lin et al. |
| 2014/0268920 A1 | 9/2014 | Fang et al. |
| 2015/0055378 A1 | 2/2015 | Lin et al. |
| 2015/0162820 A1 | 6/2015 | Zhang et al. |
| 2015/0180347 A1 | 6/2015 | Fang et al. |
| 2015/0295499 A1 | 10/2015 | Zhang et al. |
| 2015/0311804 A1 | 10/2015 | Fang |
| 2016/0028318 A1 | 1/2016 | Fang et al. |
| 2016/0218631 A1 | 7/2016 | Zhang et al. |
| 2016/0315543 A1 | 10/2016 | Zhang et al. |
| 2016/0329818 A1 | 11/2016 | Lin et al. |
| 2016/0329821 A1 | 11/2016 | Zhang et al. |
| 2016/0365792 A1 | 12/2016 | Zhang et al. |
| 2017/0187293 A1 | 6/2017 | Fang et al. |

FOREIGN PATENT DOCUMENTS

| | | |
|---|---|---|
| CN | 1929274 A | 3/2007 |
| CN | 1964172 A | 5/2007 |
| CN | 1988347 A | 6/2007 |
| CN | 101034851 A | 9/2007 |
| CN | 101039077 A | 9/2007 |
| CN | 101079576 A | 11/2007 |
| CN | 101127495 A | 2/2008 |
| CN | 101247083 A | 8/2008 |
| CN | 101295872 A | 10/2008 |
| CN | 101350562 A | 1/2009 |
| CN | 101515756 A | 8/2009 |
| CN | 101552560 A | 10/2009 |
| CN | 101577468 A | 11/2009 |
| CN | 101577488 A | 11/2009 |
| CN | 101826796 A | 9/2010 |
| CN | 101515756 B | 11/2011 |

(56) References Cited

FOREIGN PATENT DOCUMENTS

| CN | 102332826 A | 1/2012 |
|---|---|---|
| CN | 102474964 A | 5/2012 |
| CN | 102624237 A | 8/2012 |
| CN | 102651613 A | 8/2012 |
| CN | 102709880 A | 10/2012 |
| CN | 102723945 A | 10/2012 |
| CN | 102983760 A | 3/2013 |
| CN | 103166198 A | 6/2013 |
| CN | 103296904 A | 9/2013 |
| TW | 200840174 A | 10/2008 |
| TW | 200937157 A | 9/2009 |
| TW | I 437808 | 5/2014 |
| TW | I 448060 | 8/2014 |

OTHER PUBLICATIONS

U.S. Office Action dated Feb. 24, 2015, in U.S. Appl. No. 13/722,788.
U.S. Office Action dated Mar. 12, 2015, in U.S. Appl. No. 13/857,836.
U.S. Office Action dated Mar. 12, 2015, in U.S. Appl. No. 13/915,477.
Chinese Patent Office, Office Action dated Dec. 8, 2014, in Application No. 201110034669.9.
Taiwan Patent Office, Office Action dated Oct. 6, 2014, in Application No. 102115002.
Taiwan Patent Office, Office Action dated Oct. 1, 2014, in Application No. 102116551.
U.S. Notice of Allowance dated Sep. 18, 2014, in U.S. Appl. No. 13/946,917.
U.S. Notice of Allowance dated Oct. 23, 2014, in U.S. Appl. No. 13/646,239.
U.S. Office Action dated Nov. 5, 2014, in U.S. Appl. No. 13/052,869.
U.S. Notice of Allowance dated Nov. 25, 2013, in U.S. Appl. No. 13/164,608.
U.S. Office Action dated Dec. 5, 2012, in U.S. Appl. No. 12/859,138.
U.S. Office Action dated Jul. 31, 2013, in U.S. Appl. No. 12/859,138.
U.S. Notice of Allowance dated Jan. 16, 2014, in U.S. Appl. No. 13/215,028.
U.S. Office Action dated Feb. 15, 2013, in U.S. Appl. No. 13/052,869.
U.S. Office Action dated Oct. 1, 2013, in U.S. Appl. No. 13/052,869.
U.S. Office Action dated Aug. 27, 2013, in U.S. Appl. No. 13/626,239.
Chinese Patent Office, Office Action dated Nov. 14, 2013, in Application No. 201110224933.5.
Chinese Patent Office, Office Action dated Nov. 12, 2013, in Application No. 201110051423.2.
Chinese Patent Office, Office Action dated Nov. 7, 2013, in Application No. 201210342097.5.
Chinese Patent Office, Office Action dated Nov. 5, 2013, in Application No. 201210529679.4.
Chinese Patent Office, Office Action dated Nov. 5, 2013, in Application No. 201310078547.9.
Chinese Patent Office, Office Action dated Jun. 4, 2014, in Application No. 201110144768.2.
Taiwan Patent Office, Office Action dated Mar. 3, 2014, in Application No. 100127088.
U.S. Notice of Allowance dated Jul. 30, 2014, in U.S. Appl. No. 12/859,138.
U.S. Notice of Allowance dated Jul. 7, 2014, in U.S. Appl. No. 13/164,608.
U.S. Notice of Allowance dated Jun. 25, 2014, in U.S. Appl. No. 13/215,028.
U.S. Notice of Allowance dated Mar. 18, 2014, in U.S. Appl. No. 13/215,028.
U.S. Notice of Allowance dated Mar. 7, 2014, in U.S. Appl. No. 13/164,608.
U.S. Office Action dated Apr. 1, 2014, in U.S. Appl. No. 13/052,869.
U.S. Office Action dated Apr. 1, 2014, in U.S. Appl. No. 13/646,239.
Taiwan Patent Office, Office Action dated Oct. 16, 2015, in Application No. 102116550.
U.S. Notice of Allowance dated Oct. 2, 2015, in U.S. Appl. No. 13/052,869.
U.S. Notice of Allowance dated Oct. 2, 2015, in U.S. Appl. No. 13/722,788.
U.S. Notice of Allowance dated Oct. 5, 2015, in U.S. Appl. No. 13/915,477.
U.S. Notice of Allowance dated Sep. 30, 2015, in U.S. Appl. No. 13/857,836.
Taiwan Patent Office, Office Action dated May 6, 2015, in Application No. 102116550.
U.S. Notice of Allowance dated Jun. 22, 2015, in U.S. Appl. No. 13/052,869.
U.S. Notice of Allowance dated Aug. 7, 2015, in U.S. Appl. No. 14/151,209.
Chinese Patent Office, Office Action dated Dec. 4, 2015, in Application No. 201410226277.6.
Chinese Patent Office, Office Action dated Nov. 25, 2015, in Application No. 201310656906.4.
U.S. Notice of Allowance dated Nov. 16, 2015, in U.S. Appl. No. 14/151,209.
U.S. Notice of Allowance dated Jan. 8, 2016, in U.S. Appl. No. 13/052,869.
U.S. Notice of Allowance dated Feb. 1, 2016, in U.S. Appl. No. 13/722,788.
U.S. Notice of Allowance dated Feb. 10, 2016, in U.S. Appl. No. 13/857,836.
U.S. Notice of Allowance dated Feb. 22, 2016, in U.S. Appl. No. 13/915,477.
U.S. Office Action dated Mar. 7, 2016, in U.S. Appl. No. 14/293,280.
U.S. Notice of Allowance dated Sep. 22, 2016, in U.S. Appl. No. 14/293,280.
U.S. Notice of Allowance dated Apr. 21, 2016, in U.S. Appl. No. 14/684,047.
U.S. Notice of Allowance dated Oct. 21, 2016, in U.S. Appl. No. 14/684,047.
U.S. Office Action dated Apr. 20, 2016, in U.S. Appl. No. 14/488,176.
U.S. Notice of Allowance dated Oct. 13, 2016, in U.S. Appl. No. 14/488,176.
U.S. Office Action dated Nov. 2, 2016, in U.S. Appl. No. 14/824,018.
U.S. Office Action dated Dec. 29, 2016, in U.S. Appl. No. 15/040,674.
U.S. Office Action dated Mar. 7, 2017, in U.S. Appl. No. 15/099,419.
United States Patent and Trademark Office, Office Action dated May 26, 2017, in U.S. Appl. No. 15/081,523.
United States Patent and Trademark Office, Office Action dated Mar. 22, 2017, in U.S. Appl. No. 15/152,362.
United States Patent and Trademark Office, Office Action dated Mar. 30, 2017, in U.S. Appl. No. 15/376,290.
United States Patent and Trademark Office, Office Action dated Jun. 30, 2017, in U.S. Appl. No. 14/824,018.
United States Patent and Trademark Office, Notice of Allowance dated Jul. 5, 2017, in U.S. Appl. No. 15/040,674.
United States Patent and Trademark Office, Office Action dated Aug. 8, 2017, in U.S. Appl. No. 15/376,290.
United States Patent and Trademark Office, Notice of Allowance dated Sep. 11, 2017, in U.S. Appl. No. 15/040,674.
United States Patent and Trademark Office, Office Action dated Aug. 29, 2017, in U.S. Appl. No. 15/098,002.
United States Patent and Trademark Office, Office Action dated Oct. 4, 2017, in U.S. Appl. No. 15/099,419.
United States Patent and Trademark Office, Notice of Allowance dated Nov. 14, 2017, in U.S. Appl. No. 14/824,018.

(56) References Cited

OTHER PUBLICATIONS

United States Patent and Trademark Office, Notice of Allowance dated Nov. 17, 2017, in U.S. Appl. No. 15/376,290.
United States Patent and Trademark Office, Notice of Allowance dated Dec. 1, 2017, in U.S. Appl. No. 15/081,523.

* cited by examiner

US 9,871,451 B2

SYSTEMS AND METHODS FOR VOLTAGE CONTROL AND CURRENT CONTROL OF POWER CONVERSION SYSTEMS WITH MULTIPLE OPERATION MODES

1. CROSS-REFERENCES TO RELATED APPLICATIONS

This application claims priority to Chinese Patent Application No. 201210342097.5, filed Sep. 14, 2012, incorporated by reference herein for all purposes.

2. BACKGROUND OF THE INVENTION

The present invention is directed to integrated circuits. More particularly, the invention provides systems and methods for voltage regulation and current regulation. Merely by way of example, the invention has been applied to a power conversion system. But it would be recognized that the invention has a much broader range of applicability.

FIG. 1 is a simplified diagram showing a conventional flyback power conversion system. The power conversion system 100 includes a primary winding 102, a secondary winding 104, an auxiliary winding 114, a power switch 106, a current sensing resistor 108, two rectifying diodes 110 and 116, two capacitors 112 and 118, three resistors 120, 122 and 124, and a system controller 160. For example, the power switch 106 is a bipolar transistor. In another example, the power switch 106 is a MOS transistor.

As shown in FIG. 1, the power conversion system 100 uses a transformer including the primary winding 102 and the secondary winding 104 to isolate a primary side and a secondary side of the power conversion system 100. Information related to an output voltage 126 on the secondary side can be extracted through the auxiliary winding 114 and a feedback signal 154 is generated based on information related to the output voltage 126. The controller 160 receives the feedback signal 154, and generates a drive signal 156 to turn on and off the switch 106 in order to regulate the output voltage 126.

When the power switch 106 is closed (e.g., on), the energy is stored in the transformer including the primary winding 102 and the secondary winding 104. Then, when the power switch 106 is open (e.g., off), the stored energy is released to the output terminal, and the voltage of the auxiliary winding 114 maps the output voltage 126 as follows.

$$V_{FB} = \frac{R_2}{R_1 + R_2} \times V_{aux} = k \times n \times (V_O + V_F + I_O \times R_{eq}) \quad \text{(Equation 1)}$$

where $V_{FB}$ represents the feedback signal 154, $V_{aux}$ represents a voltage 158 of the auxiliary winding 114, $R_1$ and $R_2$ represent the resistance values of the resistors 122 and 124 respectively. In addition, k represents a feedback coefficient, n represents a turns ratio of the secondary winding 104 and the auxiliary winding 114, and $R_{eq}$ represents a cable resistance 120. Further, $V_O$ represents the output voltage 126, $I_O$ represents an output current 128, and $V_F$ represents a forward voltage of the rectifying diode 110.

A switching period of the switch 106 includes an on-time period during which the switch 106 is closed (e.g., on) and an off-time period during which the switch 106 is open (e.g., off). For example, in a discontinuous conduction mode (DCM), a next switching cycle does not start until a period of time after the completion of a demagnetization process associated with the transformer including the primary winding 102 and the secondary winding 104. In another example, in a continuous conduction mode (CCM), a next switching cycle starts before the completion of the demagnetization process. Thus, the actual length of the demagnetization process before the next switching cycle starts is limited to the off-time period of the switch 106. In yet another example, in a quasi-resonant (QR) mode or a critical conduction mode (CRM), a next switching cycle starts shortly after the completion of the demagnetization process. FIG. 2(A), FIG. 2(B) and FIG. 2(C) are simplified conventional timing diagrams for the power conversion system 100 that operates in the DCM mode, in the CCM mode, and the QR mode (e.g., the CRM mode), respectively.

FIG. 2(A) is a simplified conventional timing diagram for the flyback power conversion system 100 that operates in the discontinuous conduction mode (DCM). The waveform 170 represents the voltage 158 of the auxiliary winding 114 as a function of time, and the waveform 172 represents a secondary current 162 flowing through the secondary winding 104 as a function of time. Three time periods are shown in FIG. 2(A), including an on-time period $T_{on}$, an off-time period $T_{off}$ and a demagnetization period $T_{Demag}$. For example, $T_{on}$ starts at time $t_0$ and ends at time $t_1$, $T_{Demag}$ starts at the time $t_1$ and ends at time $t_3$, and $T_{off}$ starts at the time $t_3$ and ends at time $t_4$. In another example, $t_0 \leq t_1 \leq t_2 \leq t_3 \leq t_4$.

The controller 160 often implements a sample-and-hold mechanism. When the demagnetization process on the secondary side of the power conversion system 100 is almost completed (e.g., at $t_3$), the secondary current 162 becomes almost zero (e.g., as shown by the waveform 172). The voltage 158 of the auxiliary winding 114 is usually sampled at $t_2$ (e.g., point A). The sampled voltage value is often held until the voltage 158 is sampled again during a next demagnetization period. Through a negative feedback loop, the sampled voltage value can become equal to a reference voltage $V_{ref}$ as follows:

$$V_{FB} = V_{ref} \quad \text{(Equation 2)}$$

Thus, the output voltage 126 can be determined as follows:

$$V_O = \frac{V_{ref}}{k \times n} - V_F - I_O \times R_{eq} \quad \text{(Equation 3)}$$

As shown in FIG. 2(A), after the demagnetization process ends (e.g., at $t_3$), one or more valleys (e.g., the valleys 180, 181 and 182) appear in the voltage 158 of the auxiliary winding 114 (e.g., as shown by the waveform 170) before the start of a next switching cycle, as an example. In another example, the power conversion system 100 operates in a valley skipping mode. That is, the next switching cycle is triggered by a valley other than the first valley (e.g., the valley 180).

FIG. 2(B) is a simplified conventional timing diagram for the flyback power conversion system 100 that operates in the continuous conduction mode (CCM). The waveform 202 represents the voltage 158 of the auxiliary winding 114 as a function of time, the waveform 204 represents a secondary current 162 flowing through the secondary winding 104 as a function of time, and the waveform 206 represents a primary current 164 flowing through the primary winding 102 as a function of time. Three time periods are shown in FIG. 2(B), including an on-time period $T_{on}$, an off-time period $T_{off}$ and a demagnetization period $T_{Demag}$. For example, $T_{on}$ starts at time $t_5$ and ends at time $t_6$, $T_{Demag}$ starts at the time $t_6$ and ends at time $t_8$, and $T_{off}$ starts at the time $t_6$ and ends at the time $t_8$. In another example, $t_5 \leq t_6 \leq t_7 \leq t_8$.

FIG. 2(C) is a simplified conventional timing diagram for the flyback power conversion system 100 that operates in the quasi-resonant (QR) mode (e.g., the CRM mode). The waveform 208 represents the voltage 158 of the auxiliary winding 114 as a function of time, the waveform 210 represents a secondary current 162 flowing through the secondary winding 104 as a function of time, and the waveform 212 represents a primary current 164 flowing through the primary winding 102 as a function of time. In addition, the waveform 214 represents an internal signal of the controller 160 associated with the demagnetization process as a function of time, and the waveform 216 represents the drive signal 156 as a function of time.

Three time periods are shown in FIG. 2(C), including an on-time period $T_{on}$, an off-time period $T_{off}$ and a demagnetization period $T_{Demag}$. For example, $T_{on}$ starts at time $t_9$ and ends at time $t_{10}$, $T_{Demag}$ starts at the time $t_{10}$ and ends at time $t_{12}$, and $T_{off}$ starts at the time $t_{10}$ and ends at the time $t_{13}$. In another example, $t_9 \leq t_{10} \leq t_{11} \leq t_{12} \leq t_{13}$.

For example, the power conversion system 100 operates in a valley switching mode. That is, after the demagnetization process ends (e.g., at $t_{12}$), a next switching cycle is triggered when the power conversion system 100 detects a first valley (e.g., the valley 220) in the voltage 158 of the auxiliary winding 114 (e.g., as shown by the waveform 208).

As discussed above, the power conversion system 100 can operate in the DCM mode, the CCM mode, or the QR mode (e.g., the CRM mode and/or the valley switching mode). However, when operating in a single mode, the power conversion system 100 often does not have a satisfactory efficiency under certain circumstances. Hence, it is highly desirable to improve techniques for voltage regulation and current regulation of a power conversion system.

3. BRIEF SUMMARY OF THE INVENTION

The present invention is directed to integrated circuits. More particularly, the invention provides systems and methods for voltage regulation and current regulation. Merely by way of example, the invention has been applied to a power conversion system. But it would be recognized that the invention has a much broader range of applicability.

According to one embodiment, a system controller for regulating a power conversion system includes an operation-mode-selection component and a driving component. The operation-mode-selection component is configured to receive a first signal related to an output load of the power conversion system and a second signal related to an input signal received by the power conversion system and output a mode-selection signal based on at least information associated with the first signal and the second signal. The driving component is configured to receive the mode-selection signal and generate a drive signal based on at least information associated with the mode-selection signal, the driving signal corresponding to a switching frequency. The operation-mode-selection component is further configured to, if the output load is determined to be larger than a first load threshold in magnitude and the input signal is determined to be larger than an input threshold, generate the mode-selection signal corresponding to a quasi-resonant mode if the switching frequency is determined to be smaller than a first frequency threshold and larger than a second frequency threshold. In addition, the operation-mode-selection component is configured to, if the output load is determined to be larger than the first load threshold in magnitude and the input signal is determined to be smaller than the input threshold, generate the mode-selection signal corresponding to a continuous conduction mode if the switching frequency is determined to be equal to the second frequency threshold.

According to another embodiment, a system controller for regulating a power conversion system includes a driver component, a first sample-and-hold component, a second sample-and-hold component, a first switch, a second switch, and a signal processing component. The driver component is configured to output a drive signal in order to affect an output signal of the power conversion system, the drive signal being associated with a switching frequency corresponding to a switching period, the switching period including an on-time period and a demagnetization period. The first sample-and-hold component includes a first capacitor and is configured to sample and hold a current sensing signal associated with a primary current flowing through a primary winding of the power conversions system at at least a first time during the on-time period and generate a first held sampled signal based on at least information associated with the current sensing signal. The second sample-and-hold component includes a second capacitor and is configured to sample and hold the current sensing signal at at least a second time during the on-time period and generate a second held sampled signal based on at least information associated with the current sensing signal, the second time being later than the first time. The first switch includes a first switch terminal and a second switch terminal, the first switch terminal being coupled to the first capacitor, the second switch terminal being coupled to the second capacitor, the first switch being further configured to be closed during the demagnetization period and open during the on-time period. The second switch includes a third switch terminal and a fourth switch terminal, the third switch terminal being coupled to the first switch terminal, the second switch being further configured to be closed during the demagnetization period and open during the on-time period. The signal processing component is configured to receive a combined signal from the fourth switch terminal if the first switch and the second switch are closed and output a processed signal based on at least information associated with the combined signal to the driver component.

According to yet another embodiment, a system controller for regulating a power conversion system includes a driver component, a sample-and-hold component, a switch, a signal processing component, and an operation-mode-selection component. The driver component is configured to output a drive signal in order to affect an output signal of the power conversion system, the drive signal being associated with a switching frequency corresponding to a switching period, the switching period including an on-time period and a demagnetization period. The sample-and-hold component includes a first capacitor and is configured to sample and hold a current sensing signal associated with a primary current flowing through a primary winding of the power conversions system at a middle point of the on-time period and generate a held sampled signal based on at least information associated with the current sensing signal. The switch includes a first switch terminal and a second switch terminal, the first switch terminal being coupled to the first capacitor, the switch being further configured to be closed during the demagnetization period and open during the on-time period. The signal processing component is configured to receive a third signal from the second switch terminal if the switch is closed and output a processed signal based on at least information associated with the third signal to the driver component. The operation-mode-selection component is configured to receive a first signal related to an output load of the power conversion system and a second signal related to an input signal received by the power conversion system and output a mode-selection signal based on at least information associated with the first signal and the second signal. The driver component is further configured to receive the mode-selection signal and generate the drive signal based on at least information associated with the mode-selection signal.

In one embodiment, a method for regulating a power conversion system includes receiving a first signal related to an output load of the power conversion system and a second signal related to an input signal received by the power conversion system, processing information associated with the first signal and the second signal, and generating a mode-selection signal based on at least information associated with the first signal and the second signal. In addition, the method includes receiving the mode-selection signal, processing information associated with the mode-selection signal, and generating a drive signal based on at least information associated with the mode-selection signal. The process for generating a mode-selection signal based on at least information associated with the first signal and the second signal includes if the output load is determined to be larger than a first load threshold in magnitude and the input signal is determined to be larger than an input threshold, generating the mode-selection signal corresponding to the quasi-resonant mode if the switching frequency is determined to be smaller than a first frequency threshold and larger than a second frequency threshold. The process for generating a mode-selection signal based on at least information associated with the first signal and the second signal further includes if the output load is determined to be larger than the first load threshold in magnitude and the input signal is determined to be smaller than the input threshold, generating the mode-selection signal corresponding to the continuous conduction mode if the switching frequency is determined to be equal to the second frequency threshold.

In another embodiment, a method for regulating a power conversion system includes generating a drive signal in order to affect an output signal of the power conversion system, the drive signal being associated with a switching frequency corresponding to a switching period, the switching period including an on-time period and a demagnetization period, and sampling and holding, by at least a first sample-and-hold component, at at least a first time during the on-time period, a current sensing signal in order to generate a first held sampled signal, the current sensing signal being associated with a primary current flowing through a primary winding of the power conversions system, the first sample-and-hold component including a first capacitor. The method further includes sampling and holding, by at least a second sample-and-hold component, at at least a second time during the on-time period, the current sensing signal in order to generate a second held sampled signal, the second sample-and-hold component including a second capacitor, the second time being later than the first time. In addition, the method includes generating a combined signal during the demagnetization period by at least a first switch, the first switch including a first switch terminal coupled to the first capacitor and a second switch terminal coupled to the second capacitor, receiving the combined signal by at least a second switch including a third switch terminal and a fourth switch terminal, the third switch terminal being coupled to the first switch terminal, and outputting a processed signal based on at least information associated with the combined signal during the demagnetization period.

In yet another embodiment, a method for regulating a power conversion system includes receiving a first signal related to an output load of the power conversion system and a second signal related to an input signal received by the power conversion system, processing information associated with the first signal and the second signal, and generating a mode-selection signal based on at least information associated with the first signal and the second signal. The method further includes receiving the mode-selection signal, processing information associated with the mode-selection signal, and generating the drive signal based on at least information associated with the mode-selection signal in order to affect an output signal of the power conversion system, the drive signal being associated with a switching frequency corresponding to a switching period, the switching period including an on-time period and a demagnetization period. In addition, the method includes sampling and holding, by at least a sample-and-hold component, at a middle point of the on-time period, a current sensing signal in order to generate a held sampled signal, the current sensing signal being associated with a primary current flowing through a primary winding of the power conversions system, the sample-and-hold component including a capacitor, receiving a third signal during the demagnetization period through at least a switch coupled to the capacitor, and outputting a processed signal based on at least information associated with the third signal during the demagnetization period.

Many benefits are achieved by way of the present invention over conventional techniques. Certain embodiments of the present invention provide systems and methods to employ multiple operation modes so that a power conversion system operates in a discontinuous conduction mode under no/light load conditions, operates in a quasi-resonant mode under medium load conditions, and operates, under full/heavy load conditions, in a continuous conduction mode for a low line input voltage or in the quasi-resonant mode for a high line input voltage in order to improve the overall efficiency of the power conversion system. Some embodiments of the present invention provide systems and methods to operate the power conversion system in a valley switching mode for a high line input voltage to reduce the switching loss and improve the system efficiency. Certain embodiments of the present invention provide systems and methods to operate the power conversion system in a continuous conduction mode for a low line input voltage to reduce the conduction loss and improve the system efficiency. Some embodiments of the present invention provide systems and methods to operate the power conversion system in a frequency reduction mode (e.g., the discontinuous conduction mode or a valley skipping mode) under no/very light load conditions to reduce the switching loss and improve the system efficiency. Certain embodiments of the present invention provide systems and methods to operate the power conversion system in a quasi-resonant mode for a medium-high input voltage and/or under light load conditions to reduce the switching loss. Some embodiments of the present invention provide systems and methods to operate the power conversion system in a fixed frequency mode (e.g., CCM) for a low input voltage and/or under a full/heavy load conditions to reduce the conduction loss and improve the system efficiency.

Depending upon embodiment, one or more of these benefits may be achieved. These benefits and various additional objects, features and advantages of the present inven-

4. BRIEF DESCRIPTION OF THE DRAWINGS

5. DETAILED DESCRIPTION OF THE INVENTION

The present invention is directed to integrated circuits. More particularly, the invention provides systems and methods for voltage regulation and current regulation. Merely by way of example, the invention has been applied to a power conversion system. But it would be recognized that the invention has a much broader range of applicability.

Figure 1:
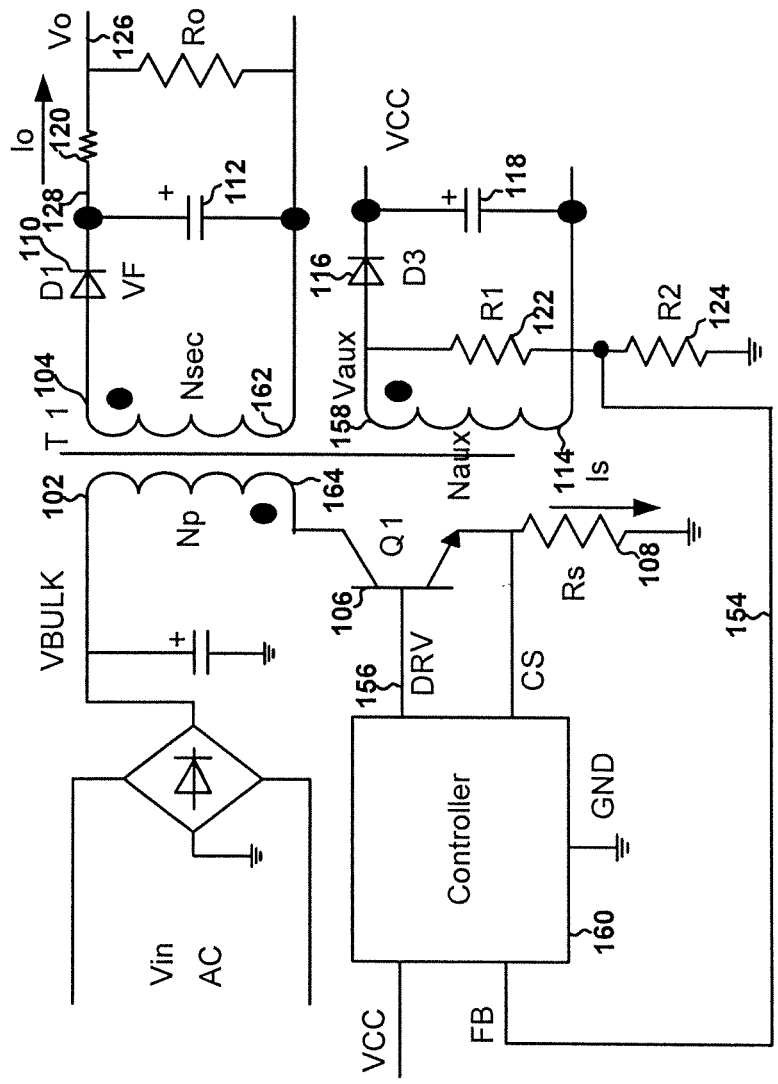
FIG. 1 is a simplified diagram showing a conventional flyback power conversion system.
Figure 2A:
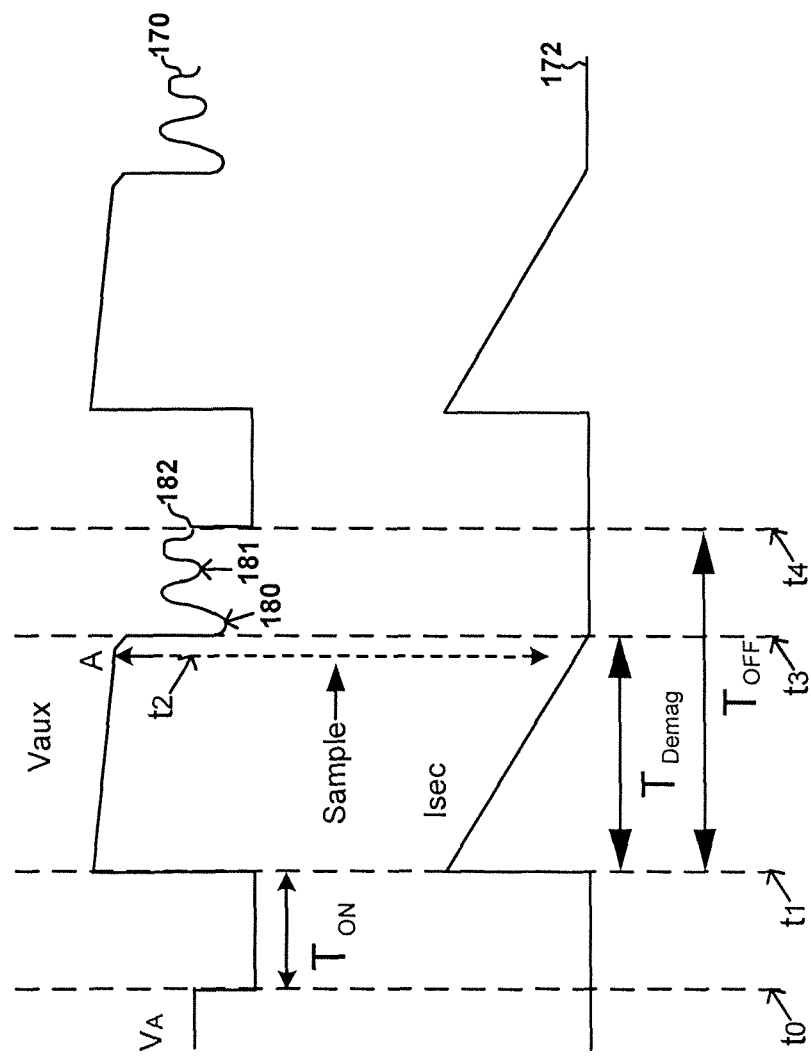
FIG. 2(A) is a simplified conventional timing diagram for the power conversion system as shown in FIG. 1 that operates in the discontinuous conduction mode (DCM).
Figure 2B:
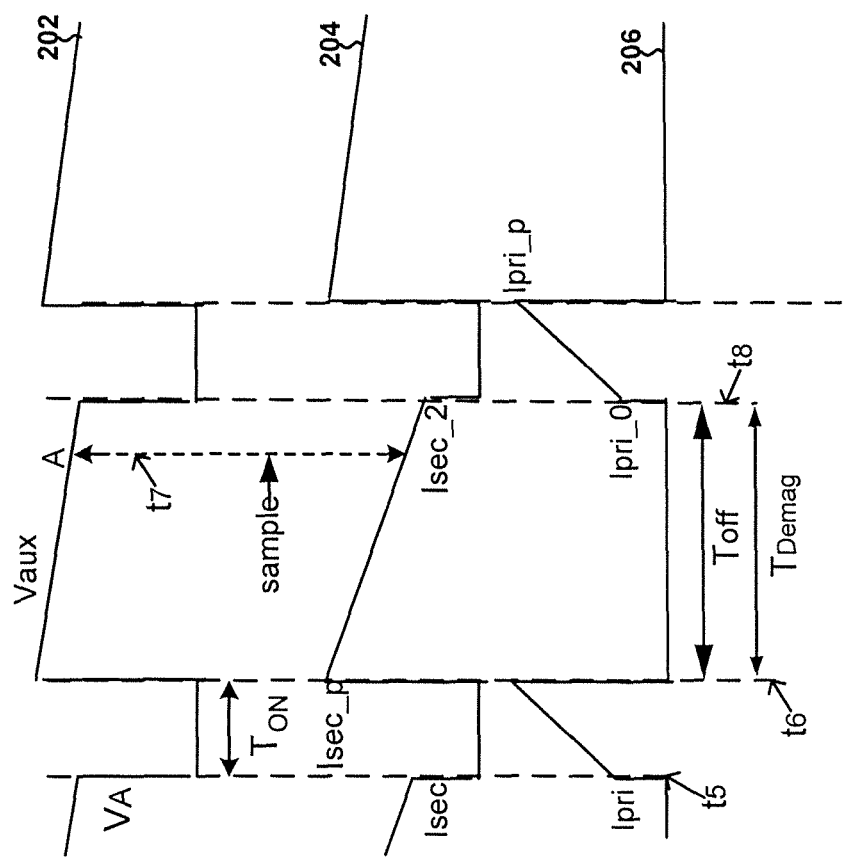
FIG. 2(B) is a simplified conventional timing diagrams for the power conversion system as shown in FIG. 1 that operates in the continuous conduction mode (CCM).
Figure 2C:
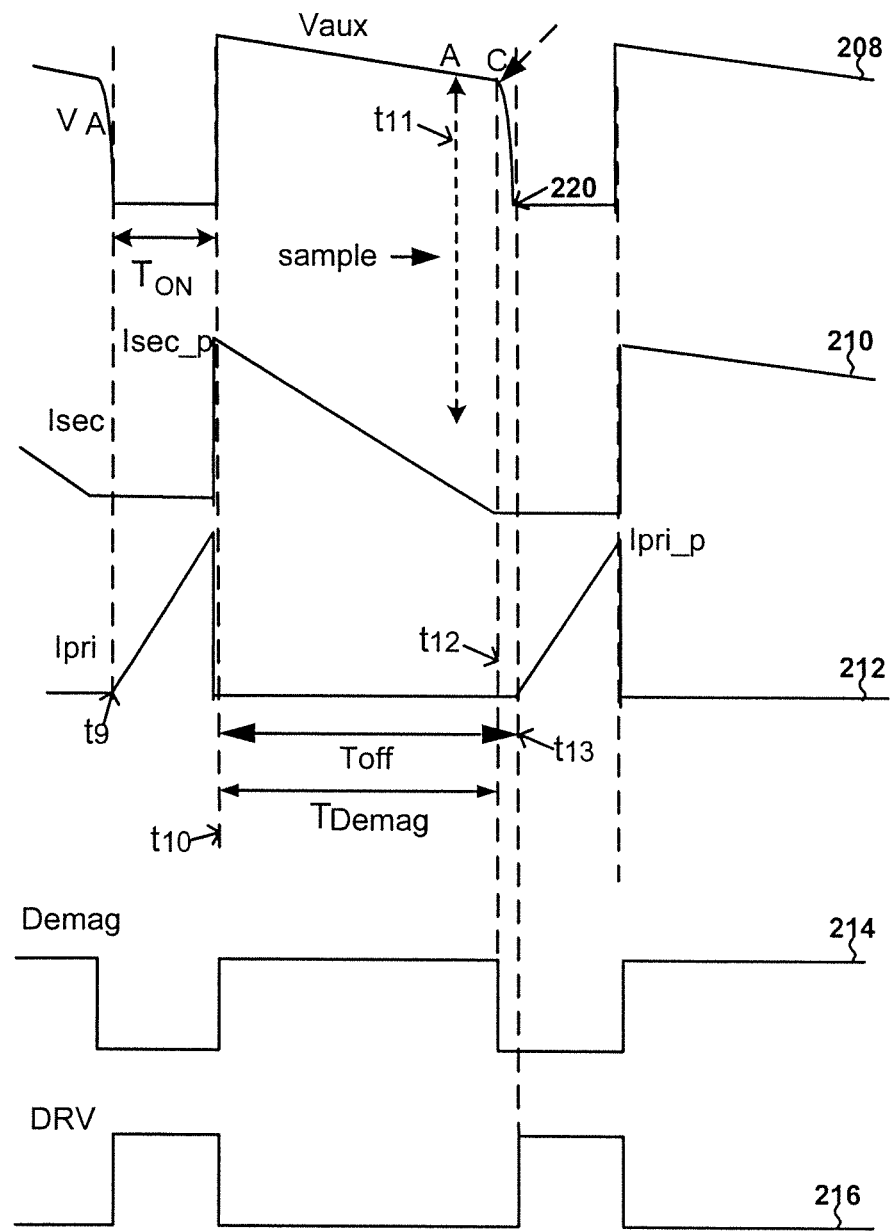
FIG. 2(C) is a simplified conventional timing diagrams for the power conversion system as shown in FIG. 1 that operates in the quasi-resonant (QR) mode.

Referring to FIG. 1, power loss in the power conversion system 100 often includes a switching loss and a conduction loss. The conduction loss usually is associated with an on-resistance of the power switch 106. For example, when the power conversion system 100 receives a high line input voltage, the switching loss contributes more to the power loss than the conduction loss. In another example, when the power conversion system 100 receives a low line input voltage, the conduction loss contributes more to the power loss than the switching loss if the output load is full/heavy. Accordingly, multiple operation modes can be implemented in order to reduce the power loss of power conversion systems with various load conditions and/or input voltages.

Figure 3A:
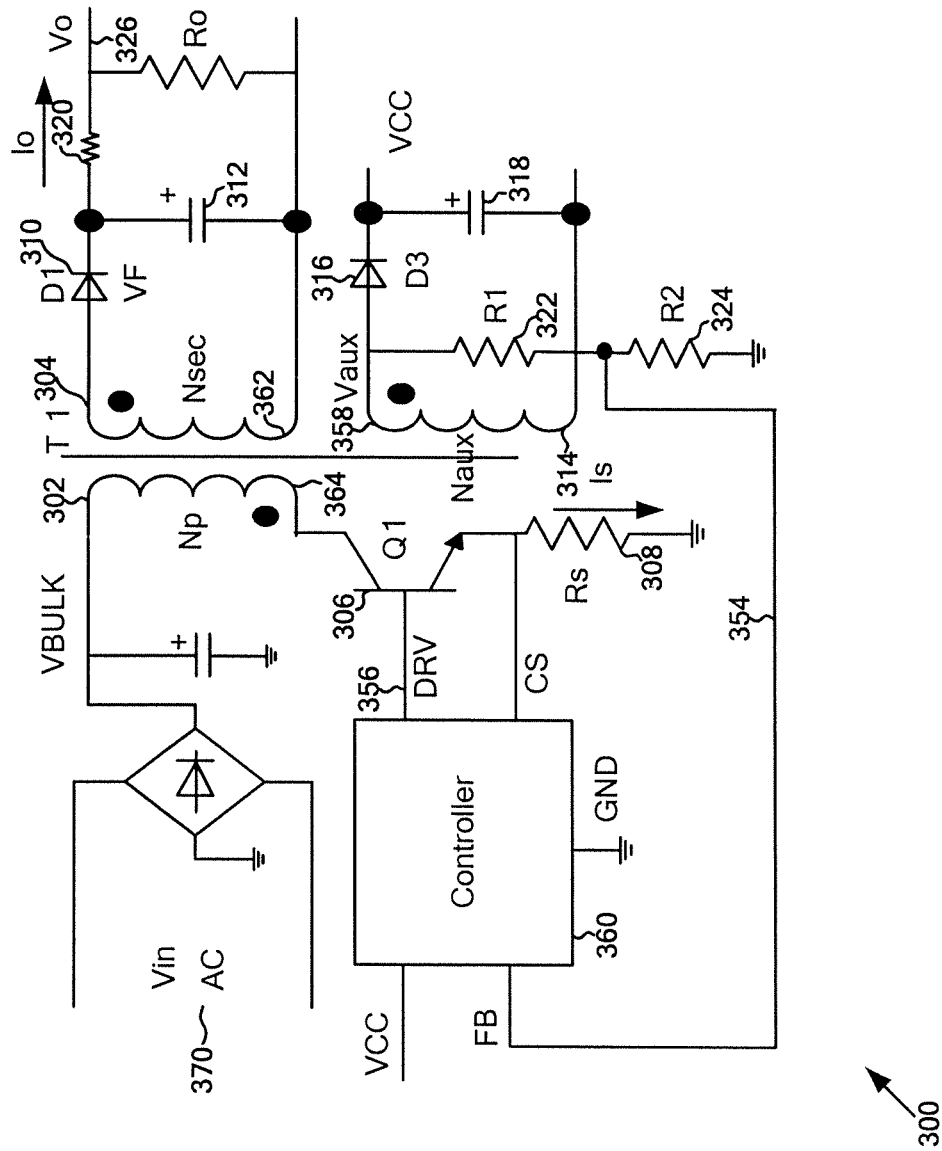
FIG. 3(A) is a simplified diagram showing a power conversion system with a controller according to an embodiment of the present invention.

FIG. 3(A) is a simplified diagram showing a power conversion system with a controller according to an embodiment of the present invention. This diagram is merely an example, which should not unduly limit the scope of the claims. One of ordinary skill in the art would recognize many variations, alternatives, and modifications. The power conversion system 300 includes a primary winding 302, a secondary winding 304, an auxiliary winding 314, a power switch 306, a current sensing resistor 308, two rectifying diodes 310 and 316, two capacitors 312 and 318, three resistors 320, 322 and 324, and a system controller 360. For example, the power switch 306 is a bipolar transistor. In another example, the power switch 306 is a MOS transistor.

According to one embodiment, the power conversion system 300 uses a transformer including the primary winding 302 and the secondary winding 304 to isolate a primary side and a secondary side of the power conversion system 300. For example, the power conversion system 300 receives an input voltage 370 on the primary side. In another example, information related to an output voltage 326 on the secondary side can be extracted through the auxiliary winding 314 and a feedback signal 354 is generated based on information related to the output voltage 326. In another example, the controller 360 receives the feedback signal 354, and generates a drive signal 356 to turn on and off the switch 306 in order to regulate the output voltage 326. In yet another example, the operation mode (e.g., DCM, CCM, QR) of the power conversion system 300 is affected by the controller 360.

Figure 3B:
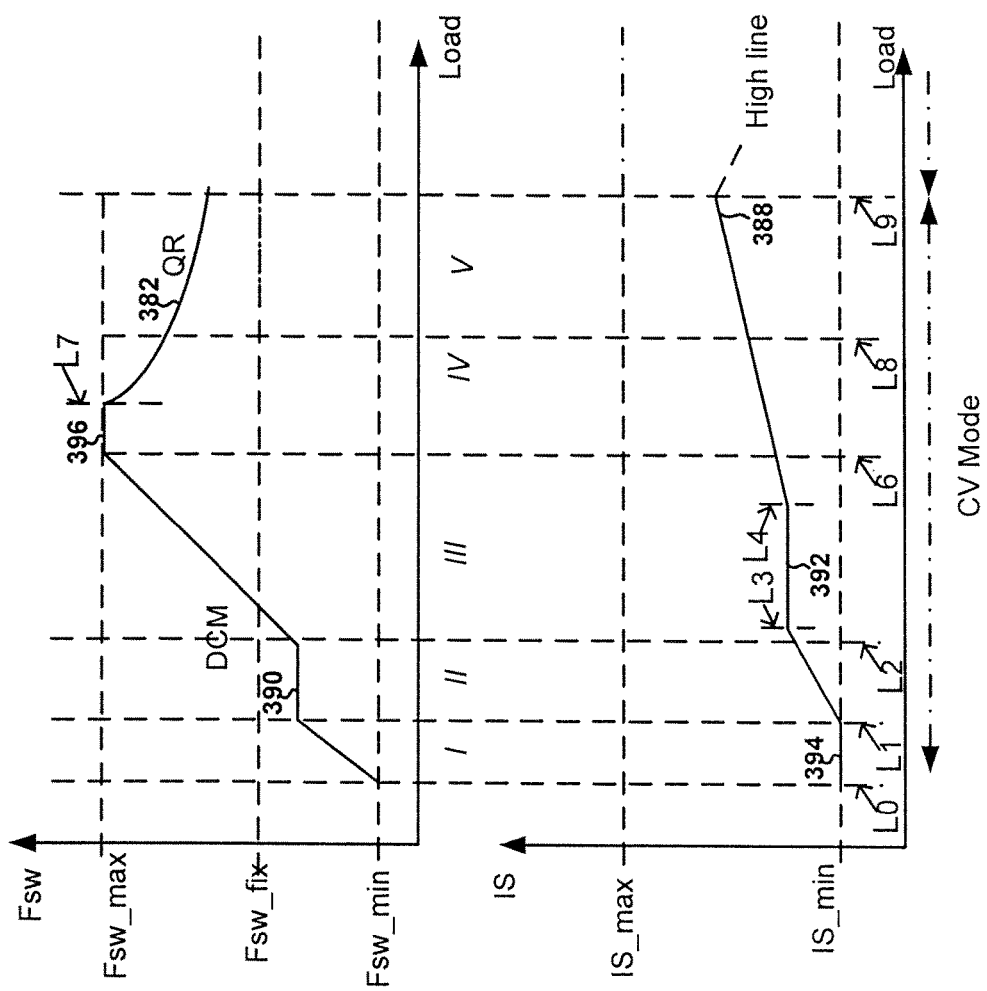
FIG. 3(B) is a simplified diagram showing a switching frequency of the power conversion system as shown in FIG. 3(A) and a primary current flowing through the primary winding of the power conversion system as shown in FIG. 3(A) according to an embodiment of the present invention.

FIG. 3(B) is a simplified diagram showing a switching frequency of the power conversion system 300 and a primary current 364 flowing through the primary winding 302 of the power conversion system 300 according to an embodiment of the present invention. This diagram is merely an example, which should not unduly limit the scope of the claims. One of ordinary skill in the art would recognize many variations, alternatives, and modifications. The waveform 382 represents the switching frequency of the power conversion system 300 as a function of output load when the input voltage 370 is a high line input voltage (e.g., close to 264V AC), and the waveform 388 represents the primary current 364 of the power conversion system 300 as a function of the output load when the input voltage 370 is the high line input voltage.

Five regions are shown in FIG. 3(B), including region I, region II, region III, region IV, and region V. For example, as shown in FIG. 3(B), region I represents an output load range of $L_0$ and $L_1$, region II represents an output load range of $L_1$ and $L_2$, and region III represents an output load range of $L_2$ and $L_6$. In another example, region IV represents an output load range of $L_6$ and $L_8$, and region V is represents an output load range of $L_8$ and $L_9$. In yet another example, $L_0 \leq L_1 \leq L_2 \leq L_3 \leq L_4 \leq L_6 \leq L_7 \leq L_8 \leq L_9$ in magnitude.

According to one embodiment, as shown in FIG. 3(B), if the power conversion system 300 is under no/light/medium load conditions (e.g., in regions I, II and/or III), the system 300 operates in a DCM mode. For example, if the output load is within region I (e.g., no/very light load), the primary current 364 is kept at a low magnitude 394 (e.g., IS_min) as shown by the waveform 388. For example, the switching frequency increases as the output load increases (e.g., as shown by the waveform 382). The system 300 operates in a pulse-frequency-modulation (PFM) mode, e.g., a frequency-reduction mode, in some embodiments. For example, if the output load is within region II (e.g., light load), the switching frequency is kept at a magnitude 390 (e.g., as shown by the waveform 382). In another example, the primary current 364 increases in magnitude as the output load increases (e.g., as shown by the waveform 388). In yet another example, a turn-on time for the switch 306 increases for a given input voltage. The system 300 operates in a pulse-width-modulation (PWM) mode in certain embodiments. For example, as shown in FIG. 3(B), if the output load is within region III (e.g., medium load), the primary current 364 continues to increase in magnitude as the output load increases if the output load is smaller than $L_3$ in magnitude, and then is kept at a magnitude 392 within the load range between $L_3$ and $L_4$ (e.g., as shown by the waveform 388). In another example, if the output load is larger than $L_4$ in magnitude, the primary current 364 *b* increases in magnitude as the output load increases (e.g., as shown by the waveform 388). In yet another example, the switching frequency increases as the output load increases until reaching a maximum frequency value 396 (e.g., as shown by the waveform 382). The system 300 operates in a valley skipping mode in which a switching cycle is triggered when the system 300 detects a valley other than a first valley in a voltage 358 of the auxiliary winding 314 according to certain embodiments.

According to another embodiment, as shown in FIG. 3(B), if the output load is within region IV, the primary current 364 increases in magnitude as the output load increases (e.g., as shown by the waveform 388). For example, if the switching frequency reaches and keeps at the maximum frequency value 396 (e.g., in the output load range of $L_6$ and $L_7$), the power conversion system 300 operates in the DCM mode. In another example, if the switching frequency decreases from the maximum frequency value 396 as the output load increases (e.g., in the output load range of $L_7$ and $L_8$), the power conversion system 300 operates in the QR mode or the valley switching mode. That is, a switching cycle is triggered when the system 300 detects a valley (e.g., a first valley) in a voltage 358 of the auxiliary winding 314. According to yet another embodiment, if the output load is within region V, the primary current 364 continues to increase in magnitude as the output load increases (e.g., as shown by the waveform 388). For example, the switching frequency decreases as the output load increases (e.g., as shown by the waveform 382), and the system 300 operates in the QR mode or the valley switching mode.

Figure 3C:
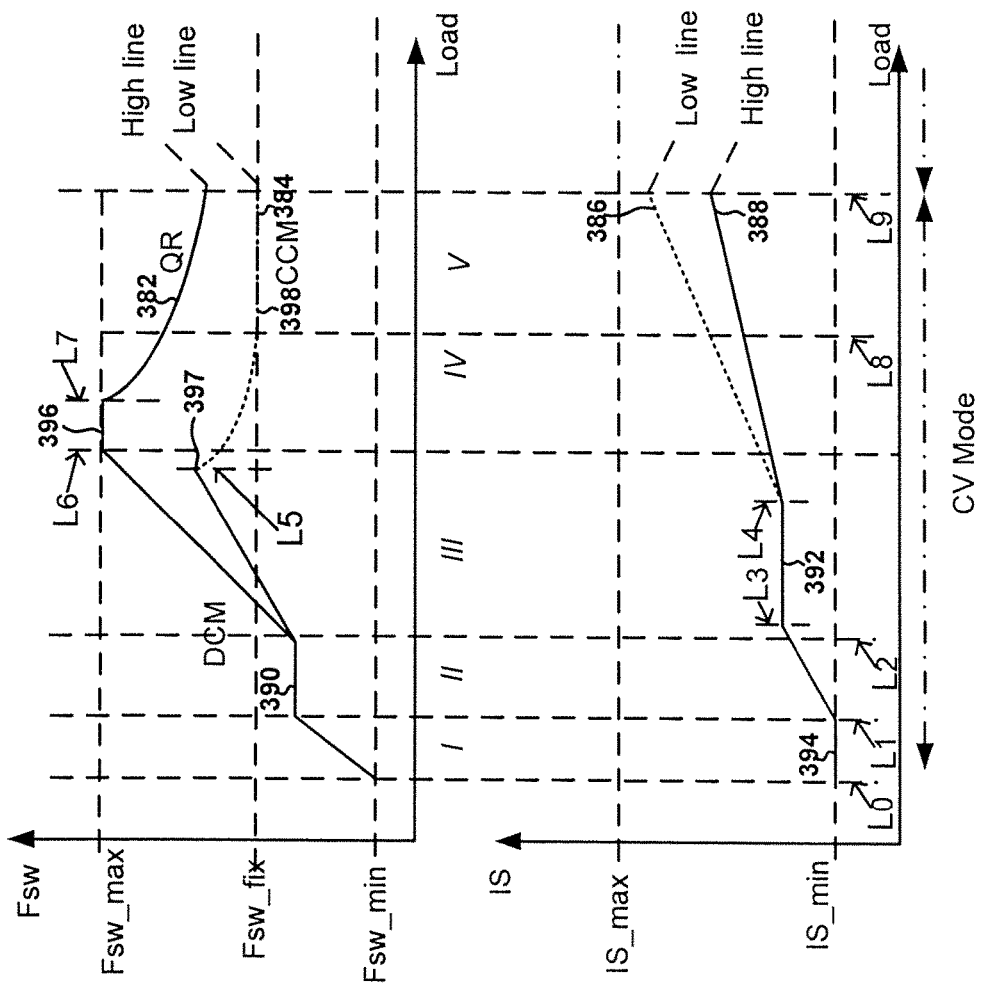
FIG. 3(C) is a simplified diagram showing a switching frequency of the power conversion system as shown in FIG. 3(A) and a primary current flowing through the primary winding of the power conversion system as shown in FIG. 3(A) according to another embodiment of the present invention.

FIG. 3(C) is a simplified diagram showing a switching frequency of the power conversion system 300 and a primary current 364 flowing through the primary winding 302 of the power conversion system 300 according to another embodiment of the present invention. This diagram is merely an example, which should not unduly limit the scope of the claims. One of ordinary skill in the art would recognize many variations, alternatives, and modifications. The waveform 382 represents the switching frequency of the power conversion system 300 as a function of output load when the input voltage 370 is a high line input voltage (e.g., close to 264V AC), the waveform 384 represents the switching frequency of the power conversion system 300 as a function of the output load when the input voltage 370 is a low line input voltage (e.g., close to 90V AC), the waveform 386 represents the primary current 364 of the power conversion system 300 as a function of the output load when the input voltage 370 is the low line input voltage, and the waveform 388 represents the primary current 364 of the power conversion system 300 as a function of the output load when the input voltage 370 is the high line input voltage.

Figure 3D:
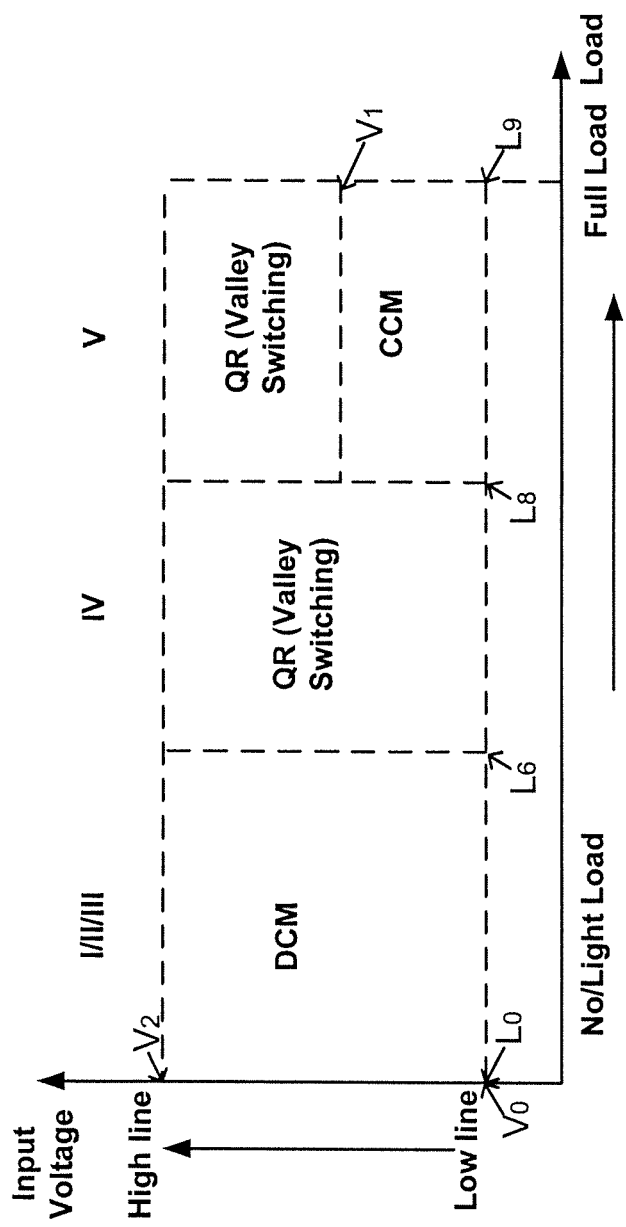
FIG. 3(D) is a simplified diagram showing multiple operation modes of the power conversion system as shown in FIG. 3(A) being determined based on the output load and the input voltage as shown in FIG. 3(B) according to an embodiment of the present invention.

FIG. 3(D) is a simplified diagram showing multiple operation modes of the power conversion system 300 being determined based on the output load and the input voltage 370 according to an embodiment of the present invention. This diagram is merely an example, which should not unduly limit the scope of the claims. One of ordinary skill in the art would recognize many variations, alternatives, and modifications. For example, as shown in FIG. 3(D), the input voltage 370 received by the system 300 is between a high line input voltage (e.g., $V_2$) and a low line input voltage (e.g., $V_0$). In yet another example, $V_0 \leq V_1 \leq V_2$.

According to one embodiment, as shown in FIG. 3(B) and FIG. 3(C), if the power conversion system 300 is under no/light load conditions (e.g., in regions I and/or II), the system 300 operates in a DCM mode regardless of the magnitude of the input voltage 370. For example, if the output load is within region I (e.g., no/very light load), the primary current 364 is kept at a low magnitude 394 (e.g., IS_min) as shown by the waveforms 386 and 388. For example, the switching frequency increases as the output load increases (e.g., as shown by the waveforms 382 and 384). The system 300 operates in a pulse-frequency-modulation (PFM) mode, e.g., a frequency-reduction mode, in some embodiments. For example, if the output load is within region II (e.g., light load), the switching frequency is kept at a magnitude 390 (e.g., as shown by the waveforms 382 and 384). In another example, the primary current 364 increases in magnitude as the output load increases (e.g., as shown by the waveforms 386 and 388). In yet another example, a turn-on time for the switch 306 increases for a given input voltage. The system 300 operates in a pulse-width-modulation (PWM) mode in certain embodiments.

According to another embodiment, as shown in FIG. 3(C), if the output load is within region III (e.g., medium load), the primary current 364 continues to increase in magnitude as the output load increases if the output load is smaller than $L_3$ in magnitude, and then is kept at a magnitude 392 within the load range between $L_3$ and $L_4$ (e.g., as shown by the waveforms 386 and 388). For example, if the output load is larger than $L_4$ in magnitude, the primary current 364 increases in magnitude as the output load increases, and increases faster when the input voltage 370 is close to the low line input voltage (e.g., $V_0$) than when the input voltage 370 is close to the high line input voltage (e.g., $V_2$) as shown by the waveforms 386 and 388. In another example, when the input voltage 370 is at the high line input voltage (e.g., $V_2$), the switching frequency increases in magnitude until reaching a maximum frequency value 396 (e.g., at $L_6$), the power conversion system 300 operates in the DCM mode. In another example, when the input voltage 370 is at the low line input voltage (e.g., $V_0$), the switching frequency increases in magnitude until reaching a maximum frequency value 397 (e.g., at $L_5$), and the power conversion system operates in the DCM mode. The border between region III and region IV varies according to the magnitude of the input voltage 370 in some embodiments. For example, when the input voltage 370 is at the high line input voltage (e.g., $V_2$), the border between region III and region IV is at the output load $L_6$. In another example, when the input voltage 370 is at the low line input voltage (e.g., $V_0$), the border between region III and region IV is at the output load $L_5$.

According to yet another embodiment, as shown in FIG. 3(C), if the output load is within region IV, the primary current 364 continues to increase in magnitude as the output load increases, and increases faster when the input voltage 370 is close to the low line input voltage than when the input voltage 370 is close to the high line input voltage (e.g., as shown by the waveforms 386 and 388). For example, when the input voltage 370 is at the high line input voltage (e.g., $V_2$), the switching frequency keeps at the maximum frequency value 396 (e.g., in the output load range of $L_6$ and $L_7$), and the power conversion system 300 operates in the DCM mode. Then, the switching frequency decreases from the maximum frequency value 396 as the output load increases (e.g., in the output load range of $L_7$ and $L_8$), and the power conversion system 300 operates in the QR mode or the valley switching mode, according to certain embodiments. For example, when the input voltage 370 is at the low line input voltage (e.g., $V_0$), the switching frequency decreases in magnitude (e.g., in the output load range of $L_5$ and $L_8$) until reaching a minimum frequency value 398 (e.g., at $L_8$), and the power conversion system 300 operates in the QR mode.

According to yet another embodiment, as shown in FIG. 3(C), if the output load is within region V, the primary current 364 continues to increase in magnitude as the output load increases, and increases faster when the input voltage 370 is close to the low line input voltage than when the input voltage 370 is close to the high line input voltage (e.g., as shown by the waveforms 386 and 388). For example, when the input voltage 370 is close to the high line input voltage (e.g., between $V_1$ and $V_2$), the switching frequency continues to decrease as the output load increases (e.g., as shown by the waveform 382). In another example, as shown in FIG. 3(C) and FIG. 3(D), the system 300 operates in the QR mode or the valley switching mode. On the other hand, when the input voltage 370 is close to the low line input voltage (e.g., between $V_0$ and $V_1$), the switching frequency keeps at the minimum frequency value 398 (e.g., $F_{SW\_fix}$) in some embodiments. For example, as shown in FIG. 3(C) and FIG. 3(D), the system 300 operates the CCM mode. The border between region IV and region V varies according to the magnitude of the input voltage 370 in certain embodiments.

As discussed above and further emphasized here, FIG. 3(B), FIG. 3(C) and FIG. 3(D) are merely examples, which should not unduly limit the scope of the claims. One of ordinary skill in the art would recognize many variations, alternatives, and modifications. For example, as shown in FIG. 3(D), the border between regions I/II/III and region IV (e.g., $L_6$) and the border between region IV and region V (e.g., $L_8$) are shown for the high line input voltage. Such borders may vary with the magnitude of the input voltage 370 in certain embodiments. In another example, when the output load is within the range of $L_6$ and $L_8$, whether the power conversion system 300 operates in the QR mode depends on the switching frequency. In yet another example, when the output load is within the range of $L_8$ and $L_9$, whether the power conversion system 300 operates in the QR mode or the CCM mode depends on the switching frequency.

Figure 4A:
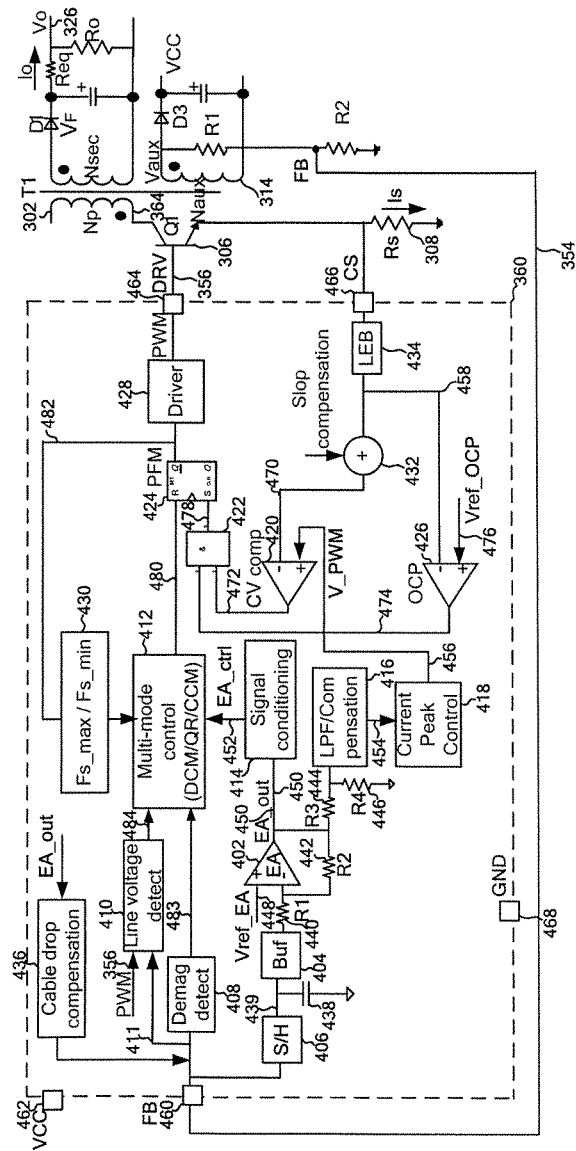
FIG. 4(A) is a simplified diagram showing certain components of the controller as part of the power conversion system as shown in FIG. 3(A) according to one embodiment of the present invention.

FIG. 4(A) is a simplified diagram showing certain components of the controller 360 as part of the power conversion system 300 according to one embodiment of the present invention. This diagram is merely an example, which should not unduly limit the scope of the claims. One of ordinary skill in the art would recognize many variations, alternatives, and modifications. The controller 360 includes an error amplifier 402, a buffer 404, a sample-and-hold component 406, a demagnetization detector 408, a line voltage detector 410, a multi-mode controller 412, a signal conditioning component 414, a filter-and-compensation component 416, a peak-current controller 418, two comparators 420 and 426, a signal processing component 422, a flip-flop component 424, a driver 428, a signal generator 430, a slope-compensation component 432, a leading-edge-blanking (LEB) component 434, a cable-drop-compensation component 436, a capacitor 438, and resistors 440, 442, 444 and 446. In addition, the controller 360 includes terminals 460, 462, 464, 466 and 468.

According to one embodiment, information related to the output voltage 326 on the secondary side is extracted through the auxiliary winding 314 and the feedback signal 354 is generated based on information related to the output voltage 326. For example, the controller 360 receives the feedback signal 354 at terminal 460 (e.g., terminal FB). In another example, the feedback signal 354 is sampled and held by the sample-and-hold component 406. In yet another example, the sampled and held signal 439 is provided to the error amplifier 402 through at least the buffer 404 and the resistor 440 and compared with a reference signal 448, and in response, the error amplifier 402 generates a signal 450. In yet another example, the demagnetization component 408 also receives the feedback signal 354, and output a signal 483 to the multi-mode controller 412. In yet another example, if the signal 356 (e.g., PWM) is at a logic high level, the line voltage detector 410 is powered on and receives a current signal 411 from the terminal 460 (e.g., terminal FB). In yet another example, the line voltage detector 410 outputs a signal 484 to the multi-mode controller 412.

According to another embodiment, the error amplifier 402 outputs the signal 450 to the signal conditioning component 414 which outputs a control signal 452 (e.g., EA ctrl) to the multi-mode controller 412 in order to affect (e.g., select) the operation mode of the power conversion system 300 (e.g., QR mode, CCM mode, or DCM mode). For example, the error amplifier 402 outputs the signal 450 to a compensation network including at least the filter-and-compensation component 416 which outputs a signal 454 to the peak current controller 418 in order to affect the primary current 364 of the primary winding 302. In another example, the peak current controller 418 generates a signal 456 to the comparator 420 which receives a signal 470 related to the primary current 364. In yet another example, the comparator 420 outputs a signal 472 based on a comparison of the signal 470 and the signal 456 to the signal processing component 422. Thus the peak value of the primary current 364 is limited in some embodiments.

For example, the comparator 426 receives a current sensing signal 458 related to the primary current 364 through at least the LEB component 434 and outputs a signal 474 based on a comparison of the signal 458 and a reference signal 476 to the signal processing component 422. In another example, the signal processing component 422 combines the signals 472 and 474 and outputs a signal 478 to the flip-flop component 424 which also receives a signal 480 from the multi-mode controller 412. In yet another example, the flip-flop component 424 outputs a signal 482 to the signal generator 430 in order to affect the switching frequency of the system 300. In yet another example, the driver 428 receives the signal 482 and outputs the signal 356 to the switch 306. In yet another example, the signal 480 indicates the operation mode of the power conversion system 300 (e.g., QR mode, CCM mode, or DCM mode).

Figure 4B:
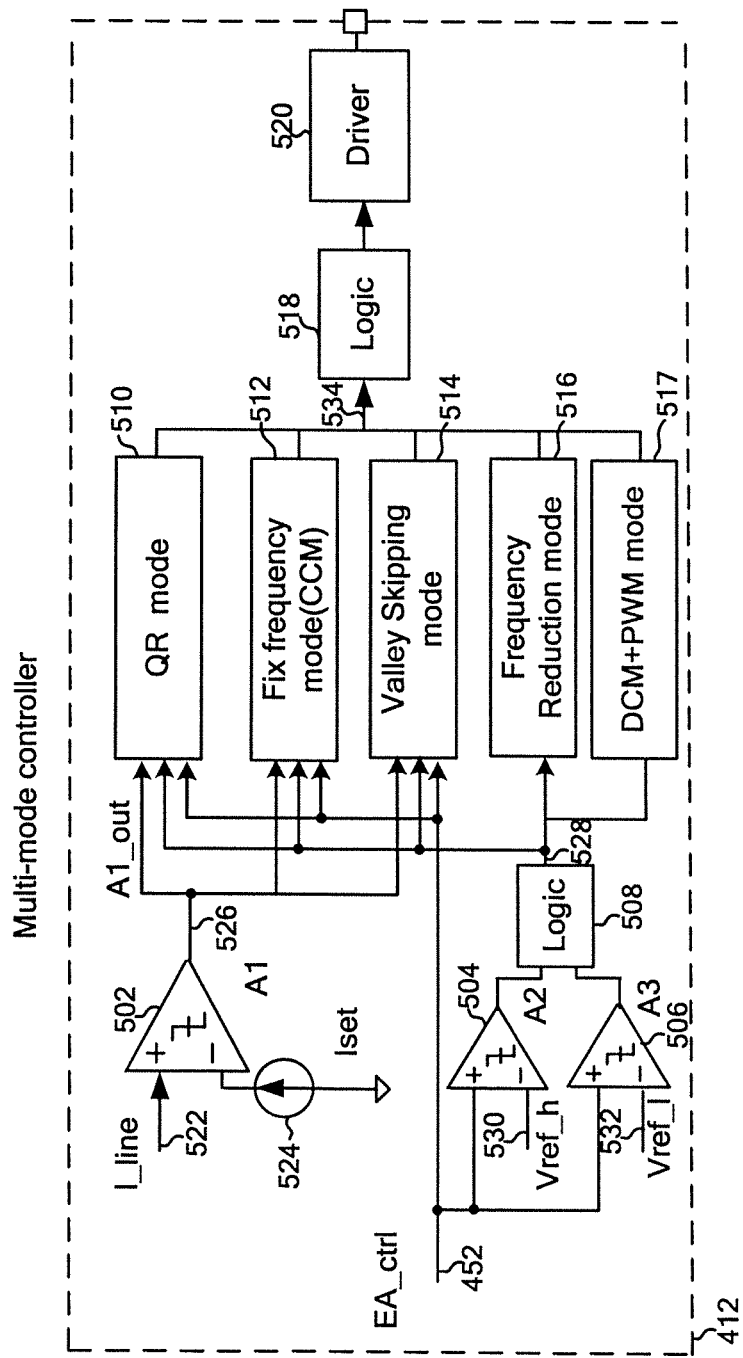
FIG. 4(B) is a simplified diagram showing certain components of the multi-mode controller as part of the controller as shown in FIG. 3(A) according to one embodiment of the present invention.

FIG. 4(B) is a simplified diagram showing certain components of the multi-mode controller 412 as part of the controller 360 according to one embodiment of the present invention. This diagram is merely an example, which should not unduly limit the scope of the claims. One of ordinary skill in the art would recognize many variations, alternatives, and modifications. For example, the multi-mode controller 412 includes a current comparator 502, two comparators 504 and 506, two logic components 508 and 518, a QR mode (e.g., CRM mode) component 510, a CCM mode component 512, a valley skipping mode component 514, a frequency reduction component 516, a DCM and PWM mode component 517, and a driver component 520. In another example, the current comparator 502 is included in the line voltage detector 410.

According to one embodiment, the current comparator 502 is activated in response to the signal 356. For example, if the signal 356 is at a logic high level, the current comparator 502 receives a current signal 522 related to the input voltage 370 from the terminal 460 (e.g., terminal FB), compares the current signal 522 with a reference current signal 524, and outputs a signal 526 that indicates the input voltage 370. For example, the control signal 452 (e.g., Ek_ctrl) are received by the comparator 504 and the comparator 506, and compared with reference signals 530 and 532 respectively. In another example, the reference signal 530 is associated with an upper threshold of the output load of the system 300, and the reference signal 532 is associated with a lower threshold of the output load of the system 300. In yet another example, the logic component 508 outputs a signal 528 that indicates the output load of the power conversion system 300.

According to another embodiment, the QR mode (e.g., CRM mode) component 510, the CCM mode component 512, the valley skipping mode component 514 receive the signal 526, the signal 528 and the signal 452, while the frequency reduction component 516 and the DCM and PWM mode component 517 receive the signal 528. For example, at least one of the QR mode (e.g., CRM mode) component 510, the CCM mode component 512, the valley skipping mode component 514, the frequency reduction component 516 and the DCM and PWM mode component 517 is activated (e.g., selected) based on at least information associated with the signal 526, the signal 528 and/or the signal 452. In another example, when the power conversion system 300 is under no/very light load conditions (e.g., region I as shown in FIG. 3(B) and FIG. 3(C)), the frequency reduction mode component 516 is activated (e.g., selected) and the system 300 operates in the DCM mode and the PFM mode. In yet another example, if the power conversion system 300 is under light load conditions (e.g., region II as shown in FIG. 3(B) and FIG. 3(C)), the DCM and PWM mode component 517 is activated (e.g., selected) and the system 300 operates in the DCM mode and the PWM mode. In yet another example, if the power conversion system 300 is under medium load conditions (e.g., region III as shown in FIG. 3(B) and FIG. 3(C)), the valley skipping mode component 514 is activated (e.g., selected), and the system 300 operates in the DCM mode or the valley skipping mode. In yet another example, when the power conversion system 300 is under medium-high load conditions and/or with a high line input voltage (e.g., region IV or the top portion of region V as shown in FIG. 3(B) and FIG. 3(C)), the QR mode component 510 is activated (e.g., selected), and the system 300 operates in the QR mode (e.g., the CRM mode or the valley switching mode). In yet another example, when the power conversion system 300 is under high load conditions with a low line input voltage (e.g., the bottom portion of region V as shown in FIG. 3(B) and FIG. 3(C)), the CCM mode component 512 is activated (e.g., selected), and the system 300 operates in the CCM mode or the fixed frequency mode.

Figure 5:
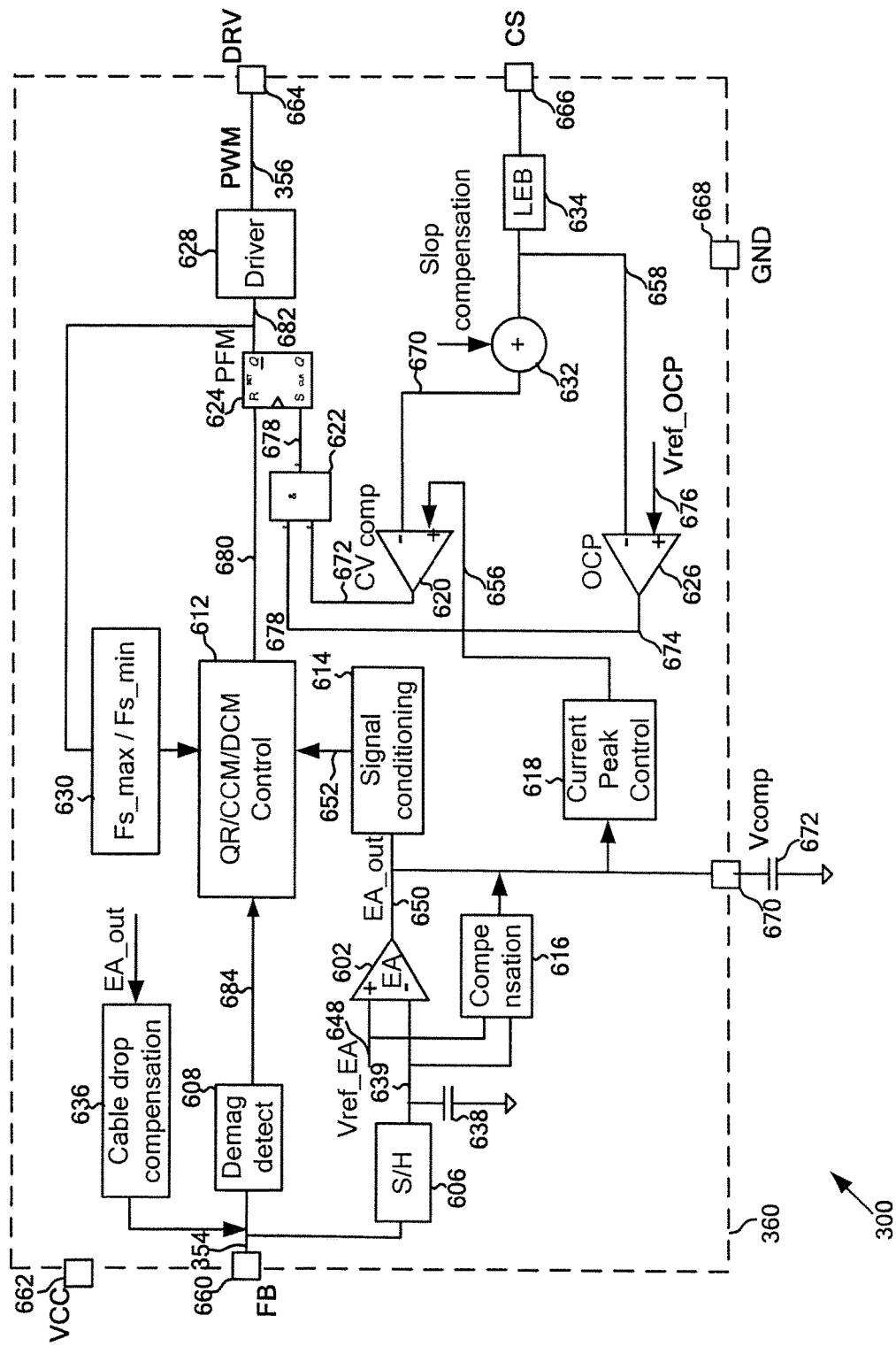
FIG. 5 is a simplified diagram showing certain components of the controller as part of the power conversion system as shown in FIG. 3(A) according to another embodiment of the present invention.

FIG. 5 is a simplified diagram showing certain components of the controller 360 as part of the power conversion system 300 according to another embodiment of the present invention. This diagram is merely an example, which should not unduly limit the scope of the claims. One of ordinary skill in the art would recognize many variations, alternatives, and modifications. The controller 360 includes an error amplifier 602, a sample-and-hold component 606, a demagnetization detector 608, a multi-mode controller 612, a signal conditioning component 614, a compensation component 616, a peak-current controller 618, two comparators 620 and 626, a signal processing component 622, a flip-flop component 624, a driver 628, a signal generator 630, a slope-compensation component 632, a leading-edge-blanking (LEB) component 634, a cable-drop-compensation component 636, a capacitor 638. In addition, the controller 360 includes terminals 660, 662, 664, 666, 668 and 670. For example, a compensation capacitor 672 is connected to the terminal 670.

According to one embodiment, the controller 360 receives the feedback signal 354 at the terminal 660 (e.g., terminal FB). In another example, the feedback signal 354 is sampled and held by the sample-and-hold component 606. In yet another example, the sampled and held signal 639 is provided to the error amplifier 602 and compared with a reference signal 648, and in response, the error amplifier 602 generates a signal 650 with at least the compensation component 616 that receives the signals 639 and 648. In yet another example, the demagnetization component 608 also receives the feedback signal 354, and outputs a signal 684 to the multi-mode controller 612.

According to another embodiment, the signal conditioning component 614 receives the signal 650 and outputs a control signal 652 to the multi-mode controller 612 in order to affect the operation mode of the power conversion system 300 (e.g., QR mode, CCM mode, DCM mode). For example, the signal 650 is provided to the current peak controller 618 in order to affect the primary current 364 of the primary winding 302. In another example, the peak current controller 618 generates a signal 656 to the comparator 620 which receives a signal 670 related to the primary current 364. In yet another example, the comparator 620 outputs a signal 672 based on a comparison of the signal 670 and the signal 656 to the signal processing component 622. Thus the peak value of the primary current 364 is limited in some embodiments.

For example, the comparator 626 receives a current sensing signal 658 related to the primary current 364 through at least the LEB component 634 and outputs a signal 674 based on a comparison of the signal 658 and a reference signal 676 to the signal processing component 622. In another example, the signal processing component 622 combines the signals 672 and 674 and outputs a signal 678 to the flip-flop component 624 which also receives a signal 680 from the multi-mode controller 612. In yet another example, the flip-flop component 624 outputs a signal 682 to the signal generator 630 in order to affect the switching frequency of the system 300. In yet another example, the driver 628 receives the signal 682 and outputs the signal 356 to the switch 306.

Figure 6:
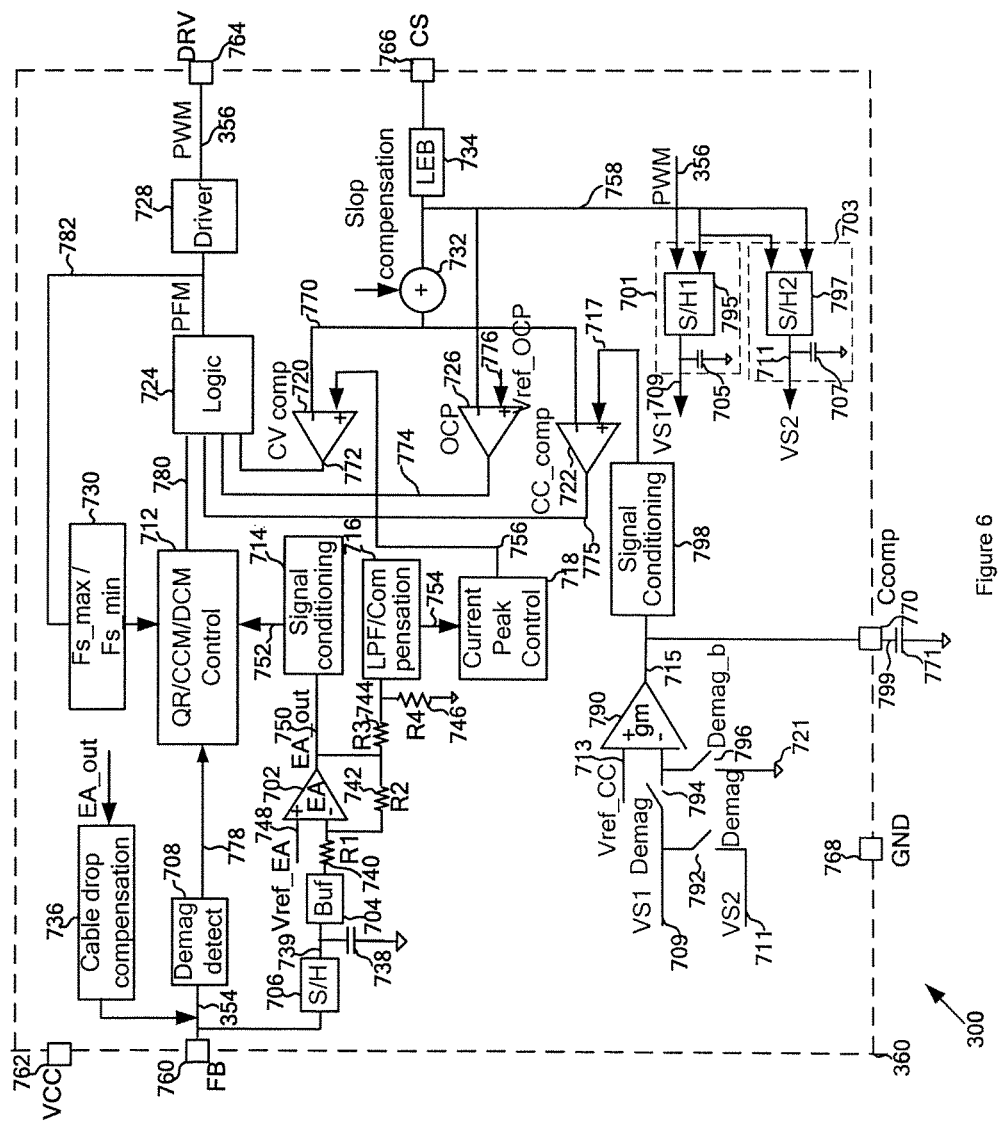
FIG. 6 is a simplified diagram showing certain components of the controller as part of the power conversion system as shown in FIG. 3(A) according to yet another embodiment of the present invention.

In addition to voltage regulation as discussed above, the controller 360 is implemented for current regulation in some embodiments. FIG. 6 is a simplified diagram showing certain components of the controller 360 as part of the power conversion system 300 according to yet another embodiment of the present invention. This diagram is merely an example, which should not unduly limit the scope of the claims. One of ordinary skill in the art would recognize many variations, alternatives, and modifications. The controller 360 includes an error amplifier 702, a buffer 704, sample-and-hold components 701, 703 and 706, a demagnetization detector 708, a multi-mode controller 712, signal conditioning components 714 and 798, a filter-and-compensation component 716, a peak-current controller 718, comparators 720, 722 and 726, a logic component 724, a driver 728, a signal generator 730, a slope-compensation component 732, a leading-edge-blanking (LEB) component 734, a cable-drop-compensation component 736, a capacitor 738, resistors 740, 742, 744 and 746, an amplifier 790, switches 792, 794 and 796. The sample-and-hold components 701 includes a sampling component 795 and a capacitor 705, and the sample-and-hold components 703 includes a sampling component 797 and a capacitor 707. In addition, the controller 360 includes terminals 760, 762, 764, 766, 768 and 770. For example, a compensation capacitor 771 is connected to the terminal 770.

According to one embodiment, the controller 360 receives the feedback signal 354 at terminal 760 (e.g., terminal FB). In another example, the feedback signal 354 is sampled and held by the sample-and-hold component 706. In yet another example, the sampled and held signal 739 is provided to the error amplifier 702 through at least the buffer 704 and the resistor 740 and compared with a reference signal 748, and in response, the error amplifier 702 generates a signal 750. In yet another example, the demagnetization component 708 receives the feedback signal 354, and output a demagnetization signal 778 to the multi-mode controller 712.

According to another embodiment, the error amplifier 702 outputs the signal 750 to the signal conditioning component 714 which outputs a control signal 752 to the multi-mode controller 712 in order to affect the operation mode of the power conversion system 300 (e.g., QR mode, CCM mode, DCM mode). For example, the error amplifier 702 outputs the signal 750 to a compensation network including at least the filter-and-compensation component 716 which outputs a signal 754 to the peak current controller 718 in order to affect the primary current 364 of the primary winding 302. In another example, the peak current controller 718 generates a signal 756 to the comparator 720 which receives a signal 770 related to the primary current 364. In yet another example, the comparator 720 outputs a signal 772 based on a comparison of the signal 770 and the signal 756 to the logic component 724. Thus the peak value of the primary current 364 is limited in some embodiments.

For example, the comparator 726 receives a current sensing signal 758 related to the primary current 364 through at least the LEB component 734 and outputs a signal 774 based on a comparison of the signal 758 and a reference signal 776 to the logic component 724. In another example, the logic component 724 also receives a signal 775 from the comparator 722 and a signal 780 from the multi-mode controller 712, and outputs a signal 782 to the signal generator 730 in order to affect the switching frequency of the system 300. In yet another example, the driver 728 receives the signal 782 and outputs the signal 356 to the switch 306.

In one embodiment, the sample-and-hold components 701 and 703 sample and hold the current sensing signal 758 at different times. For example, the switches 792 and 794 are closed or open in response to the demagnetization signal 778 that indicates the demagnetization process, and the switch 796 is closed or open in response to a complementary signal of the demagnetization signal 778. In another example, if the signal 778 indicates that the system 300 operates in the demagnetization process, the switches 792 and 794 are closed and the switch 796 is open. In yet another example, a voltage signal 719 resulting from the redistribution of the charges on the capacitors 705 and 707 is provided to the amplifier 790 during the demagnetization process. In yet another example, the voltage signal 719 is determined as follows:

$$V_{in} = \frac{V_{s1} \times C_1 + V_{s2} \times C_2}{C_1 + C_2} \qquad \text{(Equation 4)}$$

where $V_{in}$ represents the voltage signal 719, $V_{s1}$ represents a sampled and held signal 709 from the sample-and-hold component 701, and $V_{s2}$ represents a sampled and held signal 711 from the sample-and-hold component 703. In addition, $C_1$ represents the capacitance of the capacitor 705, and $C_2$ represents the capacitance of the capacitor 707. If the capacitance of the capacitor 705 is equal to the capacitance of the capacitor 707, the voltage signal 719 is determined as follows, as an example.

$$V_{in} = \frac{V_{s1} + V_{s2}}{2} \qquad \text{(Equation 5)}$$

In another embodiment, if the signal 778 indicates that the system 300 does not operate in the demagnetization process, the switches 792 and 794 are open and the switch 796 is closed. For example, a ground voltage 721 (e.g., zero) is provided to the amplifier 790. In another example, the amplifier 790 outputs a signal 715 to the signal conditioning component 798 which generates a signal 717 to the comparator 722 in order to affect the status of the switch 306 and the primary current 364.

Figure 7:
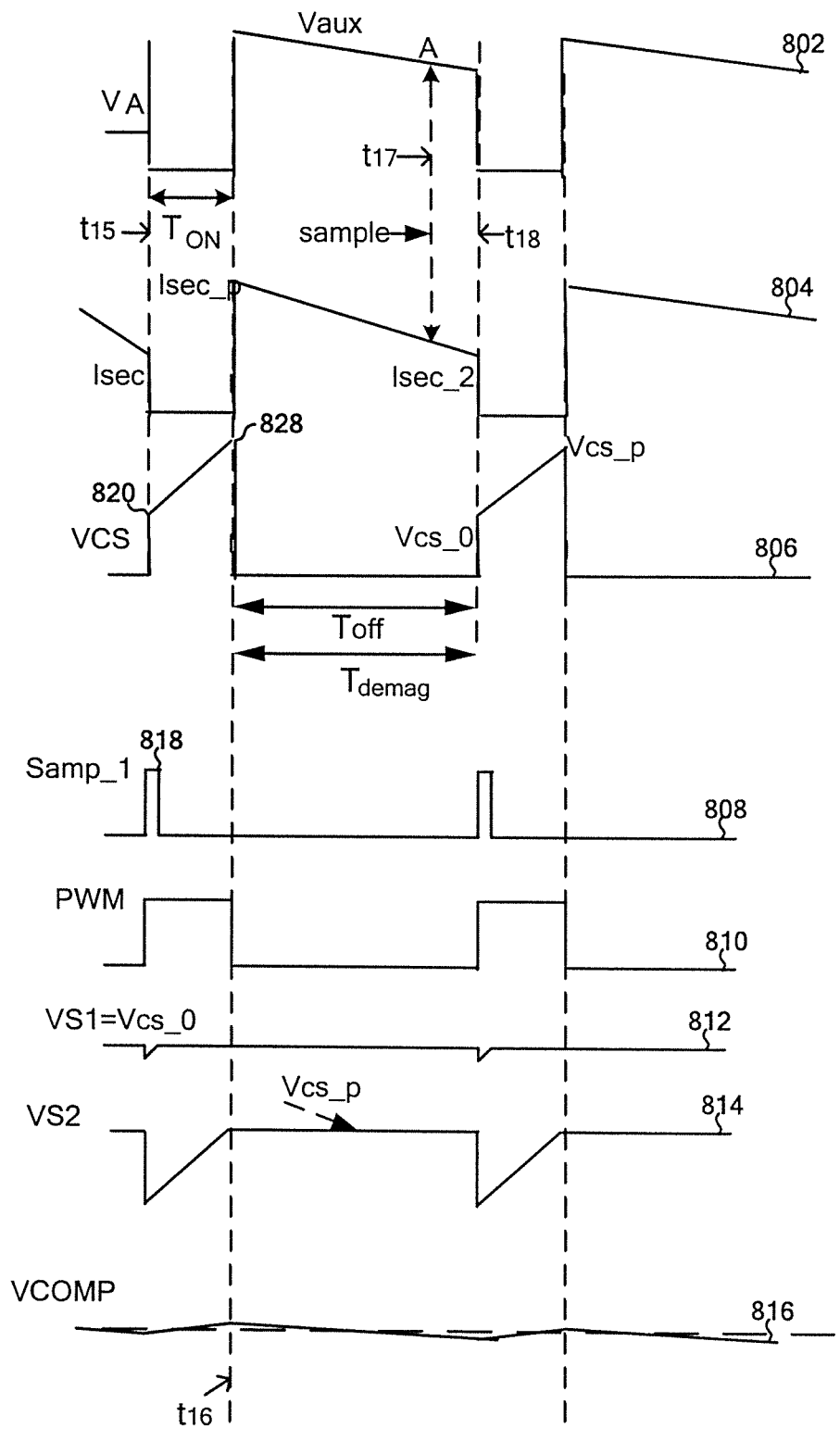
FIG. 7 is a simplified timing diagram for the power conversion system including the controller as shown in FIG. 6 that operates in the continuous conduction mode (CCM) according to an embodiment of the present invention.

FIG. 7 is a simplified timing diagram for the power conversion system 300 including the controller 360 as shown in FIG. 6 that operates in the continuous conduction mode (CCM) according to an embodiment of the present invention. This diagram is merely an example, which should not unduly limit the scope of the claims. One of ordinary skill in the art would recognize many variations, alternatives, and modifications. The waveform 802 represents the voltage 358 of the auxiliary winding 314 as a function of time, the waveform 804 represents a secondary current 362 flowing through the secondary winding 304 as a function of time, and the waveform 806 represents the current sensing signal 758 as a function of time. In addition, the waveform 808 represents an internal sampling signal of the sample-and-hold component 701 as a function of time, the waveform 810 represents the signal 356 as a function of time, and the waveform 812 represents the signal 709 as a function of time. Further, the waveform 814 represents the signal 711 as a function of time, and the waveform 816 represents a voltage 799 generated by the compensation capacitor 771.

Three time periods are shown in FIG. 7, including an on-time period $T_{on}$, a demagnetization time period $T_{demag}$, and an off-time period $T_{off}$. In the CCM mode, the demagnetization time period $T_{demag}$ is approximately equal to the off-time period $T_{off}$ in duration. For example, $T_{on}$ starts at time $t_{15}$ and ends at time $t_{16}$, $T_{Demag}$ starts at the time $t_{16}$ and ends at time $t_{18}$, and $T_{off}$ starts at the time $t_{16}$ and ends at the time $t_{18}$. In another example, $t_{15} \leq t_{16} \leq t_{17} \leq t_{18}$.

According to one embodiment, at the beginning of the on-time period (e.g., at $t_{15}$), the signal 356 changes from a logic low level to a logic high level (e.g., a rising edge shown by the waveform 810). For example, in response, a sampling pulse 818 is generated in the internal sampling signal of the sample-and-hold component 701 (e.g., as shown by the waveform 808). In another example, during the pulse period of the sampling pulse 818, the sample-and-hold component 701 samples the current sensing signal 758 which increases in magnitude and holds the magnitude 820 of the current sensing signal 758 close to the beginning of the on-time period. In yet another example, the sample-and-hold component 703 samples the current sensing signal 758 during the on-time period $T_{on}$ and holds the magnitude 828 of the current sensing signal 758 at the end of the on-time period (e.g., at $t_{16}$).

According to another embodiment, during the demagnetization period, in response to the demagnetization signal 778, the switches 792 and 794 are closed and the switch 796 is open. For example, the amplifier 790 receives a reference signal 713 and the voltage signal 719 (e.g., as shown by the waveforms 812 and 814 respectively), and outputs the signal 715. In another example, the following equation is satisfied:

$$\int (V_{cs\_p}(i)+V_{cs\_0}(i)) \times (U(t-T_s(i))-U(t-T_s(i)-T_{demag}(i))) \, dt - \int V_{ref} dt < a$$

(Equation 6)

where $i^{th}$ represents the $i^{th}$ switching cycle, $V_{cs\_p}(i)$ represents the peak magnitude of the current sensing signal 758 when the switch 306 is turned off, and $V_{cs\_0}(i)$ represents the magnitude of the current sensing signal 758 when the switch 306 is turned on. In addition, $T_S(i)$ represents the duration of the switching period, $T_{demag}(i)$ represents the duration of the demagnetization period, $V_{ref}$ represents the reference signal 713, U(t) is the unit step function, and a represents a threshold value.

In another example, the following equation can be obtained based on Equation 6:

$$\text{Limit}_{N \to \infty} \left( \sum_{i=0}^{N} (V_{cs\_p}(i) + V_{cs\_0}(i)) \times T_{demag}(i) - \sum_{i=0}^{N} V_{ref} \times T_s(i) \right) < a$$

(Equation 7)

where $V_{cs\_p}=I_{S\_P} \times R_S$, $V_{cs\_0}=I_{S\_0} \times R_S$, $I_{S\_P}$ represents the peak magnitude of the primary current 364 of the primary winding 302 when the switch 306 is turned off, $I_{S\_0}$ represents the peak magnitude of the primary current 364 of the primary winding 302 when the switch 306 is turned on, and $R_S$ represents the resistance of the resistor 308. Thus, power delivered to the output load is controlled such that the output current is kept approximately constant in some embodiments.

Figure 8:
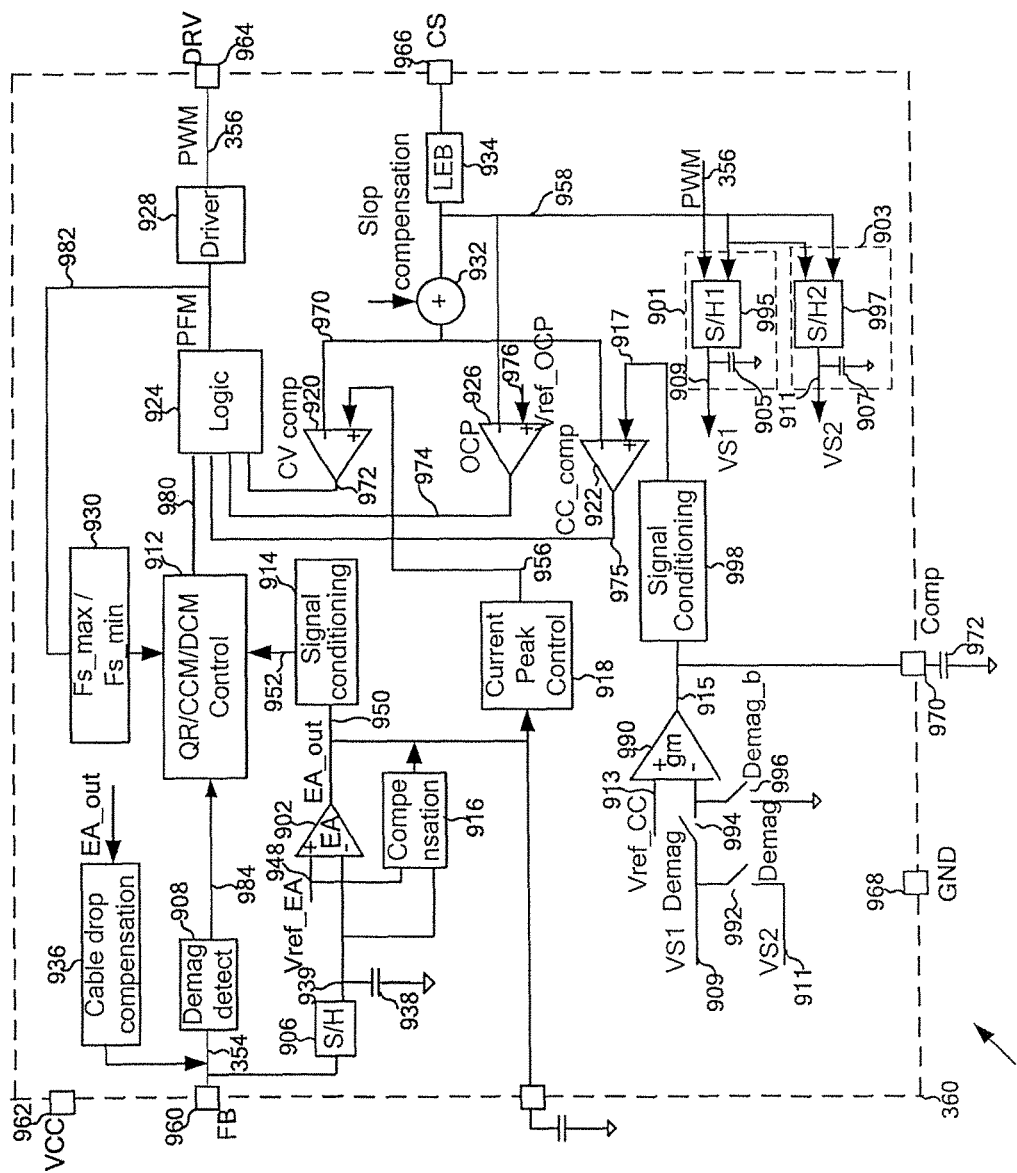
FIG. 8 is a simplified diagram showing certain components of the controller as part of the power conversion system as shown in FIG. 3(A) according to yet another embodiment of the present invention.

FIG. 8 is a simplified diagram showing certain components of the controller 360 as part of the power conversion system 300 according to yet another embodiment of the present invention. This diagram is merely an example, which should not unduly limit the scope of the claims. One of ordinary skill in the art would recognize many variations, alternatives, and modifications. The controller 360 includes an error amplifier 902, a sample-and-hold component 906, a demagnetization detector 908, a multi-mode controller 912, a signal conditioning component 914, a compensation component 916, a peak-current controller 918, comparators 920, 922 and 926, a logic component 924, a driver 928, a signal generator 930, a slope-compensation component 932, a leading-edge-blanking (LEB) component 934, a cable-drop-compensation component 936, a capacitor 938. Further, the controller 360 includes sample-and-hold components 901 and 903, switches 992, 994 and 996, an amplifier 990, and a signal conditioning component 998. The sample-and-hold component 901 includes a sampling component 995 and a capacitor 905, and the sample-and-hold component 903 includes a sampling component 997 and a capacitor 907. In addition, the controller 360 includes terminals 960, 962, 964, 966, 968 and 970. For example, a compensation capacitor 972 is connected to the terminal 970.

According to one embodiment, the controller 360 receives the feedback signal 354 at the terminal 960 (e.g., terminal FB). In another example, the feedback signal 354 is sampled and held by the sample-and-hold component 906. In yet another example, the sampled and held signal 939 is provided to the error amplifier 902 and compared with a reference signal 948, and in response, the error amplifier 902 generates a signal 950 with at least the compensation component 916 that receives the signals 939 and 948. In yet another example, the demagnetization component 908 also receives the feedback signal 354, and outputs a signal 984 to the multi-mode controller 912.

According to another embodiment, the signal conditioning component 914 receives the signal 950 and outputs a control signal 952 to the multi-mode controller 912 in order to affect the operation mode of the power conversion system 300 (e.g., QR mode, CCM mode, DCM mode). For example, the signal 950 is provided to the current peak controller 918 in order to affect the primary current 364 of the primary winding 302. In another example, the peak current controller 918 generates a signal 956 to the comparator 920 which receives a signal 970 related to the primary current 364. In yet another example, the comparator 920 outputs a signal 972 based on a comparison of the signal 970 and the signal 956 to the logic component 924. Thus the peak value of the primary current 364 is limited in some embodiments.

For example, the comparator 926 receives a current sensing signal 958 related to the primary current 364 through at least the LEB component 934 and outputs a signal 974 based on a comparison of the signal 958 and a reference signal 976 to the logic component 924. In another example, the logic component 924 also receives a signal 975 from the comparator 922 and a signal 980 from the multi-mode controller 912 and outputs a signal 982 to the signal generator 930 in order to affect the switching frequency of the system 300. In yet another example, the driver 928 receives the signal 982 and outputs the signal 356 to the switch 306.

In one embodiment, the sample-and-hold components 901 and 903 sample and hold the current sensing signal 958 at different times. For example, the switches 992 and 994 are closed or open in response to the demagnetization signal 984 that indicates the demagnetization process, and the switch 996 is closed or open in response to a complementary signal of the demagnetization signal 984. In another example, if the signal 984 indicates that the system 300 operates in the demagnetization process, the switches 992 and 994 are closed and the switch 996 is open. In yet another example, a voltage signal 919 resulting from the redistribution of the charges on the capacitors 905 and 907 is provided to the amplifier 990 during the demagnetization process. In yet another example, the voltage signal 919 is determined as follows:

$$V_{in} = \frac{V_{s1} \times C_1 + V_{s2} \times C_2}{C_1 + C_2}$$ (Equation 8)

where $V_{in}$ represents the voltage signal 919, $V_{s1}$ represents a sampled and held signal 909 from the sample-and-hold component 901, and $V_{s2}$ represents a sampled and held signal 911 from the sample-and-hold component 903. In addition, $C_1$ represents the capacitance of the capacitor 905, and $C_2$ represents the capacitance of the capacitor 907. If the capacitance of the capacitor 905 is equal to the capacitance of the capacitor 907, the voltage signal 919 is determined as follows, as an example.

$$V_{in} = \frac{V_{s1} + V_{s2}}{2}$$ (Equation 9)

In another embodiment, if the signal 984 indicates that the demagnetization process has completed, the switches 992 and 994 are open and the switch 996 is closed. In yet another example, a ground voltage 921 (e.g., zero) is provided to the amplifier 990. In yet another example, the amplifier 990 outputs a signal 915 to the signal conditioning component 998 which generates a signal 917 to the comparator 922 in order to affect the status of the switch 306 and the primary current 364.

As discussed above and further emphasized here, FIG. 6, FIG. 7 and FIG. 8 are merely examples, which should not unduly limit the scope of the claims. One of ordinary skill in the art would recognize many variations, alternatives, and modifications. For example, the waveforms shown in FIG. 7 also apply to the power conversion system 300 with the controller 306 as shown in FIG. 8. In another example, the schemes shown in FIG. 7 and FIG. 6 and/or FIG. 8 also apply to the power conversion system 300 operating in various modes, including the DCM mode and the QR mode (e.g., CRM mode).

Figure 9:
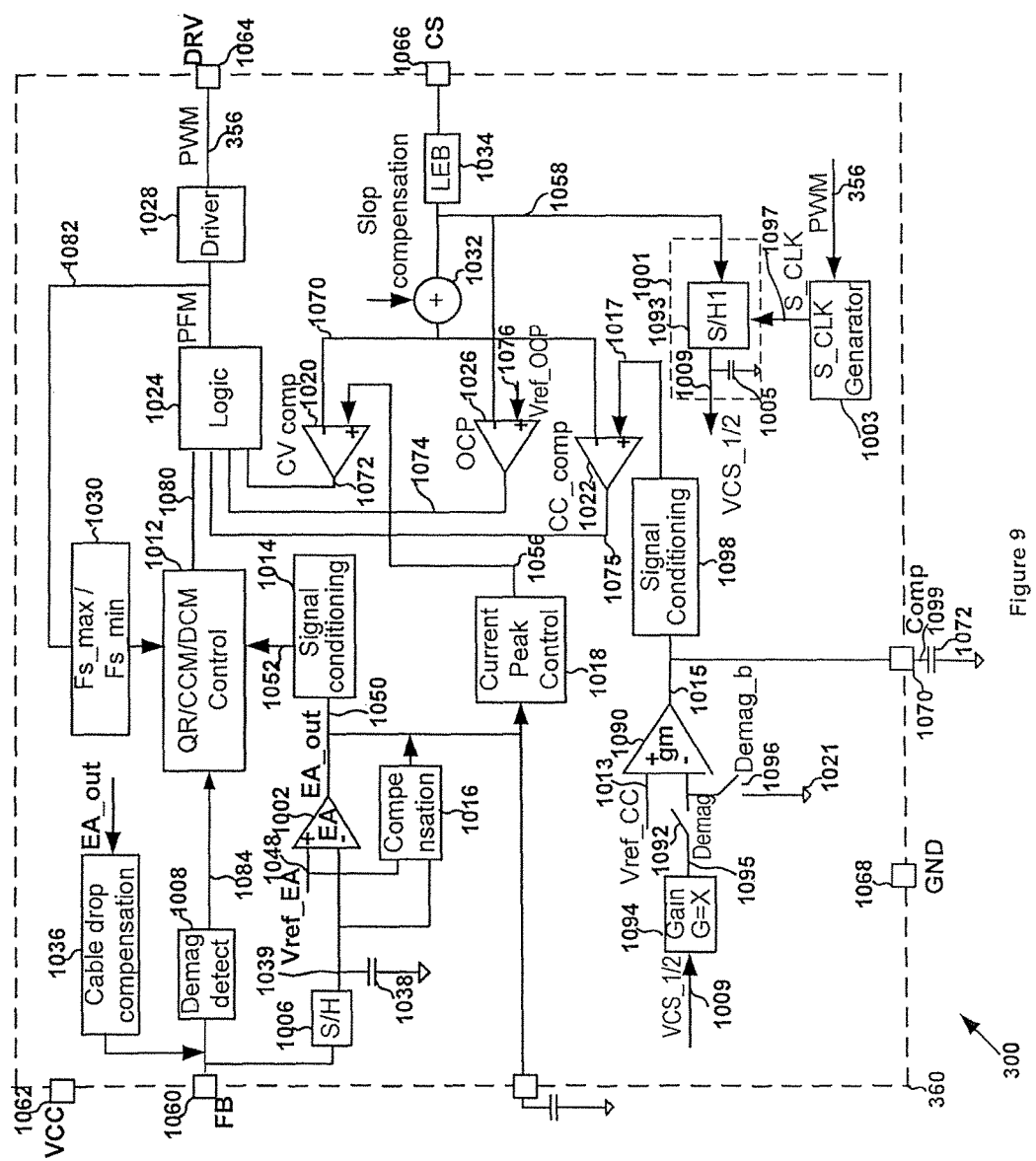
FIG. 9 is a simplified diagram showing certain components of the controller as part of the power conversion system as shown in FIG. 3(A) according to yet another embodiment of the present invention.

FIG. 9 is a simplified diagram showing certain components of the controller 360 as part of the power conversion system 300 according to yet another embodiment of the present invention. This diagram is merely an example, which should not unduly limit the scope of the claims. One of ordinary skill in the art would recognize many variations, alternatives, and modifications. The controller 360 includes an error amplifier 1002, a sample-and-hold component 1006, a demagnetization detector 1008, a multi-mode controller 1012, a signal conditioning component 1014, a compensation component 1016, a peak-current controller 1018, comparators 1020, 1022 and 1026, a logic component 1024, a driver 1028, a signal generator 1030, a slope-compensation component 1032, a leading-edge-blanking (LEB) component 1034, a cable-drop-compensation component 1036, a capacitor 1038. Further, the controller 360 includes a sample-and-hold component 1001, a signal generator 1003, switches 1092 and 1096, a gain stage 1094, an amplifier 1090, and a signal conditioning component 1098. The sample-and-hold component 1001 includes a sampling component 1093 and a capacitor 1005. In addition, the controller 360 includes terminals 1060, 1062, 1064, 1066, 1068 and 1070. For example, a compensation capacitor 1072 is connected to the terminal 1070.

According to one embodiment, the error amplifier 902, the sample-and-hold component 906, the demagnetization detector 908, the multi-mode controller 912, the signal conditioning component 914, the compensation component 916, the peak-current controller 918, the comparators 920, 922 and 926, the logic component 924, the driver 928, the signal generator 930, the slope-compensation component 932, the leading-edge-blanking (LEB) component 934, the cable-drop-compensation component 936, the capacitor 938, the switches 992 and 996, the amplifier 990, and the signal conditioning component 998 are the same as the error amplifier 1002, the sample-and-hold component 1006, the demagnetization detector 1008, the multi-mode controller 1012, the signal conditioning component 1014, the compensation component 1016, the peak-current controller 1018, the comparators 1020, 1022 and 1026, the logic component 1024, the driver 1028, the signal generator 1030, the slope-compensation component 1032, the leading-edge-blanking (LEB) component 1034, the cable-drop-compensation component 1036, the capacitor 1038, the switches 1092 and 1096, the amplifier 1090, and the signal conditioning component 1098, respectively.

According to one embodiment, the controller 360 receives the feedback signal 354 at the terminal 1060 (e.g., terminal FB). In another example, the feedback signal 354 is sampled and held by the sample-and-hold component 1006. In yet another example, the sampled and held signal 1039 is provided to the error amplifier 1002 and compared with a reference signal 1048, and in response, the error amplifier 1002 generates a signal 1050 with at least the compensation component 1016 that receives the signals 1039 and 1048. In yet another example, the demagnetization component 1008 also receives the feedback signal 354, and outputs a signal 1084 to the multi-mode controller 1012.

According to another embodiment, the signal conditioning component 1014 receives the signal 1050 and outputs a control signal 1052 to the multi-mode controller 1012 in order to affect the operation mode of the power conversion system 300 (e.g., QR mode, CCM mode, DCM mode). For example, the signal 1050 is provided to the current peak controller 1018 in order to affect the primary current 364 of the primary winding 302. In another example, the peak current controller 1018 generates a signal 1056 to the comparator 1020 which receives a signal 1070 related to the primary current 364. In yet another example, the comparator 1020 outputs a signal 1072 based on a comparison of the signal 1070 and the signal 1056 to the logic component 1024. Thus the peak value of the primary current 364 is limited in some embodiments.

For example, the comparator 1026 receives a current sensing signal 1058 related to the primary current 364 through at least the LEB component 1034 and outputs a signal 1074 based on a comparison of the signal 1058 and a reference signal 1076 to the logic component 1024. In another example, the logic component 1024 also receives a signal 1075 from the comparator 1022 and a signal 1080 from the multi-mode controller 1012 and outputs a signal 1082 to the signal generator 1030 in order to affect the switching frequency of the system 300. In yet another example, the driver 1028 receives the signal 1082 and outputs the signal 356 to the switch 306.

In one embodiment, the signal generator 1003 receives the signal 356 and outputs a sampling signal 1097 to the sample-and-hold component 1001. For example, in response, the sample-and-hold component 1001 samples the current sensing signal 1058 and holds a magnitude of the current sensing signal 1058 at a middle point of an on-time period of the switch 306. For example, the sampled and held signal 1009 is provided to the gain stage 1094. In another example, the switch 1092 is closed or open in response to the demagnetization signal 1084 that indicates the demagnetization process, and the switch 1096 is closed or open in response to a complementary signal of the demagnetization signal 1084. In yet another example, if the signal 1084 indicates that the system 300 operates during the demagnetization process, the switches 1092 is closed and the switch 1096 is open. In yet another example, the gain stage 1094 outputs a signal 1095 to the amplifier 1090 through the switches 1092. In yet another example, on the other hand, if the signal 1084 indicates that the demagnetization process has completed, the switch 1092 is open and the switch 1096 is closed. In yet another example, a ground voltage 1021 (e.g., zero) is provided to the amplifier 1090. In yet another example, the amplifier 1090 outputs a signal 1015 to the signal conditioning component 1098 which generates a signal 1017 to the comparator 1022 in order to affect the status of the switch 306 and the primary current 364.

Figure 10:
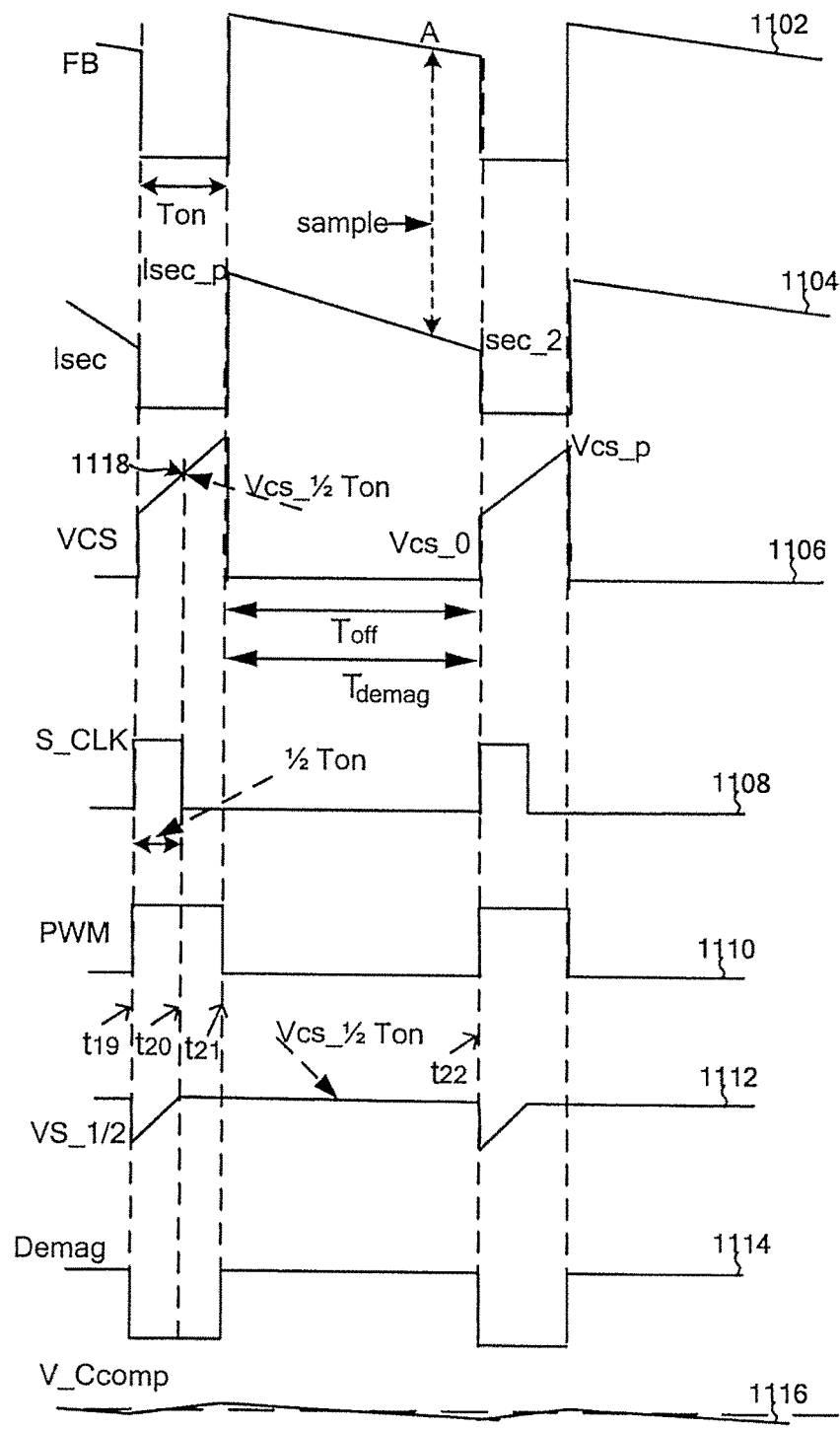
FIG. 10 is a simplified timing diagram for the power conversion system including the controller as shown in FIG. 9 that operates in the continuous conduction mode (CCM) according to an embodiment of the present invention.

FIG. 10 is a simplified timing diagram for the power conversion system 300 including the controller 360 as shown in FIG. 9 that operates in the continuous conduction mode (CCM) according to an embodiment of the present invention. This diagram is merely an example, which should not unduly limit the scope of the claims. One of ordinary skill in the art would recognize many variations, alternatives, and modifications. The waveform 1102 represents the voltage 358 of the auxiliary winding 314 as a function of time, the waveform 1104 represents a secondary current 362 flowing through the secondary winding 304 as a function of time, and the waveform 1106 represents the current sensing signal 1058 as a function of time. In addition, the waveform 1108 represents an internal sampling signal of the sample-and-hold component 1001 as a function of time, the waveform 1110 represents the signal 356 as a function of time, and the waveform 1112 represents the signal 1009 as a function of time. Further, the waveform 1114 represents the demagnetization signal 1084 as a function of time, and the waveform 1116 represents a voltage 1099 generated by the compensation capacitor 1072.

Three time periods are shown in FIG. 10, including an on-time period $T_{on}$, a demagnetization time period $T_{demag}$, and an off-time period $T_{off}$. In the CCM mode, the demagnetization time period $T_{demag}$ is approximately equal to the off-time period $T_{off}$ in duration. For example, $T_{on}$ starts at time $t_{19}$ and ends at time $t_{21}$, $T_{Demag}$ starts at the time $t_{21}$ and ends at time $t_{22}$, and $T_{off}$ starts at the time $t_{21}$ and ends at the time $t_{22}$. In another example, $t_{19} \leq t_{20} \leq t_{21} \leq t_{2}$.

According to one embodiment, at the beginning of the on-time period (e.g., at $t_{19}$), the sampling signal 1097 changes from a logic low level to a logic high level. For example, at the middle point of the on-time period (e.g., at $t_{20}$), the sampling signal 1097 changes from the logic high level to the logic low level (e.g., a falling edge as shown by the waveform 1108). In another example, in response, the sample-and-hold component 1001 samples the current sensing signal 1158 and holds a magnitude 1118 of the current sensing signal 1158 (e.g., as shown by the waveforms 1108 and 1112). In yet another example, the magnitude 1118 is determined as follows:

$$V_{cs\_\frac{1}{2}T_{on}} = I_{S\_\frac{1}{2}T_{on}} \times R_S = \frac{V_{cs\_p} + V_{cs\_0}}{2} \quad \text{(Equation 10)}$$

where $V_{cs}{}^P$ represents the peak magnitude of the current sensing signal 1058 when the switch 306 is turned off during the switching cycle, and $V_{cs\_0}$ represents the magnitude of the current sensing signal 1058 when the switch 306 is turned on during the switching cycle.

According to another embodiment, during the demagnetization period, in response to the demagnetization signal 1084, the switch 1092 is closed and the switch 1096 is open. For example, the gain stage 1094 outputs the signal 1095 to the amplifier 1090 through the switch 1092, and the amplifier 1090 outputs the signal 1015. In another example, the following equation is satisfied:

$$G \times \int V_{cs\_\frac{1}{2}T_{on}}(i) \times \\ \left(U(t - T_s(i)) - U(t - T_s(i) - T_{demag}(i))\right)dt - \int V_{ref} dt < a \quad \text{(Equation 11)}$$

where i represents the $i^{th}$ switching cycle, $$V_{cs\_\frac{1}{2}T_{on}}(i)$$

represents the magnitude of the current sensing signal 1058 at a middle point of an on-time period during the $i^{th}$ switching cycle, and $T_s(i)$ represents the duration of the switching period. In addition, $T_{demag}(i)$ represents the duration of the demagnetization period, $V_{ref}$ represents the reference signal 1013, and G represents a ratio.

In another example, the following equation can be obtained based on Equation 11:

$$\text{Limit}_{N \to \infty} \left( \sum_{i=0}^{N} G \times V_{cs\_\frac{1}{2}T_{on}}(i) \times T_{demag}(i) - \sum_{i=0}^{N} V_{ref} \times T_s(i) \right) < a \quad \text{(Equation 12)}$$

Thus, power delivered to the output load is controlled such that the output current is kept approximately constant in some embodiments. For example, if G=2, Equation 7 becomes the same as Equation 4, and Equation 8 becomes the same as Equation 5.

According to another embodiment, a system controller for regulating a power conversion system includes an operation-mode-selection component and a driving component. The operation-mode-selection component is configured to receive a first signal related to an output load of the power conversion system and a second signal related to an input signal received by the power conversion system and output a mode-selection signal based on at least information associated with the first signal and the second signal. The driving component is configured to receive the mode-selection signal and generate a drive signal based on at least information associated with the mode-selection signal, the driving signal corresponding to a switching frequency. The operation-mode-selection component is further configured to, if the output load is determined to be larger than a first load threshold in magnitude and the input signal is determined to be larger than an input threshold, generate the mode-selection signal corresponding to a quasi-resonant mode if the switching frequency is determined to be smaller than a first frequency threshold and larger than a second frequency threshold. In addition, the operation-mode-selection component is configured to, if the output load is determined to be larger than the first load threshold in magnitude and the input signal is determined to be smaller than the input threshold, generate the mode-selection signal corresponding to a continuous conduction mode if the switching frequency is determined to be equal to the second frequency threshold. For example, the system controller is implemented according to at least FIG. 3(A), FIG. 3(B), FIG. 3(C), FIG. 4(A), FIG. 4(B) and/or FIG. 5.

According to yet another embodiment, a system controller for regulating a power conversion system includes a driver component, a first sample-and-hold component, a second sample-and-hold component, a first switch, a second switch, and a signal processing component. The driver component is configured to output a drive signal in order to affect an output signal of the power conversion system, the drive signal being associated with a switching frequency corresponding to a switching period, the switching period including an on-time period and a demagnetization period. The first sample-and-hold component includes a first capacitor and is configured to sample and hold a current sensing signal associated with a primary current flowing through a primary winding of the power conversions system at at least a first time during the on-time period and generate a first held sampled signal based on at least information associated with the current sensing signal. The second sample-and-hold component includes a second capacitor and is configured to sample and hold the current sensing signal at at least a second time during the on-time period and generate a second held sampled signal based on at least information associated with the current sensing signal, the second time being later than the first time. The first switch includes a first switch terminal and a second switch terminal, the first switch terminal being coupled to the first capacitor, the second switch terminal being coupled to the second capacitor, the first switch being further configured to be closed during the demagnetization period and open during the on-time period. The second switch includes a third switch terminal and a fourth switch terminal, the third switch terminal being coupled to the first switch terminal, the second switch being further configured to be closed during the demagnetization period and open during the on-time period. The signal processing component is configured to receive a combined signal from the fourth switch terminal if the first switch and the second switch are closed and output a processed signal based on at least information associated with the combined signal to the driver component. For example, the system controller is implemented according to at least FIG. 6, FIG. 7 and/or FIG. 8.

According to yet another embodiment, a system controller for regulating a power conversion system includes a driver component, a sample-and-hold component, a switch, a signal processing component, and an operation-mode-selection component. The driver component is configured to output a drive signal in order to affect an output signal of the power conversion system, the drive signal being associated with a switching frequency corresponding to a switching period, the switching period including an on-time period and a demagnetization period. The sample-and-hold component includes a first capacitor and is configured to sample and hold a current sensing signal associated with a primary current flowing through a primary winding of the power conversions system at a middle point of the on-time period and generate a held sampled signal based on at least information associated with the current sensing signal. The switch includes a first switch terminal and a second switch terminal, the first switch terminal being coupled to the first capacitor, the switch being further configured to be closed during the demagnetization period and open during the on-time period. The signal processing component is configured to receive a third signal from the second switch terminal if the switch is closed and output a processed signal based on at least information associated with the third signal to the driver component. The operation-mode-selection component is configured to receive a first signal related to an output load of the power conversion system and a second signal related to an input signal received by the power conversion system and output a mode-selection signal based on at least information associated with the first signal and the second signal. The driver component is further configured to receive the mode-selection signal and generate the drive signal based on at least information associated with the mode-selection signal. For example, the system controller is implemented according to at least FIG. 9, and/or FIG. 10.

In one embodiment, a method for regulating a power conversion system includes receiving a first signal related to an output load of the power conversion system and a second signal related to an input signal received by the power conversion system, processing information associated with the first signal and the second signal, and generating a mode-selection signal based on at least information associated with the first signal and the second signal. In addition, the method includes receiving the mode-selection signal, processing information associated with the mode-selection signal, and generating a drive signal based on at least information associated with the mode-selection signal. The process for generating a mode-selection signal based on at least information associated with the first signal and the second signal includes if the output load is determined to be larger than a first load threshold in magnitude and the input signal is determined to be larger than an input threshold, generating the mode-selection signal corresponding to the quasi-resonant mode if the switching frequency is determined to be smaller than a first frequency threshold and larger than a second frequency threshold. The process for generating a mode-selection signal based on at least information associated with the first signal and the second signal further includes if the output load is determined to be larger than the first load threshold in magnitude and the input signal is determined to be smaller than the input threshold, generating the mode-selection signal corresponding to the continuous conduction mode if the switching frequency is determined to be equal to the second frequency threshold. For example, the method is implemented according to at least FIG. 3(A), FIG. 3(B), FIG. 3(C), FIG. 4(A), FIG. 4(B) and/or FIG. 5.

In another embodiment, a method for regulating a power conversion system includes generating a drive signal in order to affect an output signal of the power conversion system, the drive signal being associated with a switching frequency corresponding to a switching period, the switching period including an on-time period and a demagnetization period, and sampling and holding, by at least a first sample-and-hold component, at at least a first time during the on-time period, a current sensing signal in order to generate a first held sampled signal, the current sensing signal being associated with a primary current flowing through a primary winding of the power conversions system, the first sample-and-hold component including a first capacitor. The method further includes sampling and holding, by at least a second sample-and-hold component, at at least a second time during the on-time period, the current sensing signal in order to generate a second held sampled signal, the second sample-and-hold component including a second capacitor, the second time being later than the first time. In addition, the method includes generating a combined signal during the demagnetization period by at least a first switch, the first switch including a first switch terminal coupled to the first capacitor and a second switch terminal coupled to the second capacitor, receiving the combined signal by at least a second switch including a third switch terminal and a fourth switch terminal, the third switch terminal being coupled to the first switch terminal, and outputting a processed signal based on at least information associated with the combined signal during the demagnetization period. For example, the method is implemented according to at least FIG. 6, FIG. 7 and/or FIG. 8.

In yet another embodiment, a method for regulating a power conversion system includes receiving a first signal related to an output load of the power conversion system and a second signal related to an input signal received by the power conversion system, processing information associated with the first signal and the second signal, and generating a mode-selection signal based on at least information associated with the first signal and the second signal. The method further includes receiving the mode-selection signal, processing information associated with the mode-selection signal, and generating the drive signal based on at least information associated with the mode-selection signal in order to affect an output signal of the power conversion system, the drive signal being associated with a switching frequency corresponding to a switching period, the switching period including an on-time period and a demagnetization period. In addition, the method includes sampling and holding, by at least a sample-and-hold component, at a middle point of the on-time period, a current sensing signal in order to generate a held sampled signal, the current sensing signal being associated with a primary current flowing through a primary winding of the power conversions system, the sample-and-hold component including a capacitor, receiving a third signal during the demagnetization period through at least a switch coupled to the capacitor, and outputting a processed signal based on at least information associated with the third signal during the demagnetization period. For example, the method is implemented according to at least FIG. 9, and/or FIG. 10.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power conversion system, the system controller comprising:
    an operation-mode-selection component configured to receive a first signal related to an output load of the power conversion system and a second signal related to an input signal received by the power conversion system and output a mode-selection signal based on at least information associated with the first signal and the second signal; and
    a driving component configured to receive the mode-selection signal and generate a drive signal based on at least information associated with the mode-selection signal, the driving signal corresponding to a switching frequency;
    wherein the operation-mode-selection component is further configured to:
        if the output load is determined to be larger than a first load threshold in magnitude and the input signal is determined to be larger than an input threshold, generate the mode-selection signal corresponding to a first mode if the switching frequency is determined to be smaller than a first frequency threshold and larger than a second frequency threshold; and
        if the output load is determined to be larger than the first load threshold in magnitude and the input signal is determined to be smaller than the input threshold, generate the mode-selection signal corresponding to a second mode if the switching frequency is determined to be equal to the second frequency threshold;
    wherein the operation-mode-selection component is further configured to, if the output load is determined to be smaller than the first load threshold and larger than a second load threshold in magnitude, generate the mode-selection signal corresponding to the first mode if the switching frequency is determined to be smaller than the first frequency threshold and larger than the second frequency threshold; and
    wherein:
        the first mode is a valley switching mode;
        the second mode is a continuous conduction mode; and
        the first mode is different from the second mode;
    wherein the operation-mode-selection component is further configured to:
        process information associated with the first signal;
        detect an end of a demagnetization period based at least in part on the first signal;
        detect a first valley in the first signal, there being no other valley in the first signal between the end of the demagnetization period and the first valley; and
        under the valley switching mode, in response to the first valley being detected in the first signal, change the drive signal from a first logic level to a second logic level in order to trigger a switching cycle of the power conversion system.

2. The system controller of claim 1, and further comprising:
a signal processing component configured to receive a feedback signal and generate the first signal based on at least information associated with the feedback signal; and
a signal detector configured to generate the second signal based on at least information associated with the input signal.

3. The system controller of claim 2 wherein the signal processing component includes:
a sampling component configured to receive the feedback signal and output a sampled signal based on at least information associated with the feedback signal;
an error amplifier configured to receive the sampled signal and output an error signal related to the first signal based on at least information associated with the sampled signal.

4. The system controller of claim 1 wherein the operation-mode-selection component is further configured to, if the output load is determined to be smaller than the second load threshold in magnitude, generate the mode-selection signal corresponding to a third mode, wherein the third mode is a discontinuous conduction mode and the third mode is different from the first mode and the second mode.

5. The system controller of claim 4 wherein the discontinuous conduction mode is one selected from a group consisting of a valley skipping mode, a pulse-frequency-modulation mode, and a pulse-width-modulation mode.

6. The system controller of claim 5 wherein the operation-mode-selection controller includes a discontinuous-conduction-mode selector configured to receive the first signal and, if the output load is determined to be smaller than the second load threshold in magnitude, generate the mode-selection signal corresponding to the third mode.

7. The system controller of claim 1 wherein the second load threshold varies with the input signal in magnitude.

8. The system controller of claim 1 wherein the input signal is an input line voltage.

9. The system controller of claim 1 wherein the driving component includes:
a flip-flop component configured to receive the mode-selection signal and output a frequency modulation signal based on at least information associated with the mode-selection signal to the operation-mode-selection component; and
a driver configured to receive the frequency modulation signal and output the drive signal based on at least information associated with the frequency modulation signal.

10. The system controller of claim 1 wherein the first mode is one selected from a group consisting of a valley switching mode and a critical conduction mode.

11. The system controller of claim 1, and further comprising a primary-side sensing component configured to receive a feedback signal from an auxiliary winding of the power conversion system.

12. The system controller of claim 1 wherein the first load threshold varies with the input signal in magnitude.

13. The system controller of claim 1 wherein:
the input signal is larger than a third threshold in magnitude and smaller than a fourth threshold in magnitude; and
the input threshold is larger than the third threshold and smaller than the fourth threshold.

14. A system controller for regulating a power conversion system, the system controller comprising:
an operation-mode-selection component configured to receive a first signal related to an output load of the power conversion system and a second signal related to an input signal received by the power conversion system and output a mode-selection signal based on at least information associated with the first signal and the second signal; and
a driving component configured to receive the mode-selection signal and generate a drive signal based on at least information associated with the mode-selection signal, the driving signal corresponding to a switching frequency;
wherein the operation-mode-selection component is further configured to:
if the output load is determined to be larger than a first load threshold in magnitude and the input signal is determined to be larger than an input threshold, generate the mode-selection signal corresponding to a first mode if the switching frequency is determined to be smaller than a first frequency threshold and larger than a second frequency threshold; and
if the output load is determined to be larger than the first load threshold in magnitude and the input signal is determined to be smaller than the input threshold, generate the mode-selection signal corresponding to a second mode if the switching frequency is determined to be equal to the second frequency threshold;
wherein the operation-mode-selection controller includes a comparator configured to receive the second signal and a reference signal and output a comparison signal based on at least information associated with the second signal and the reference signal;
wherein the operation-mode-selection controller includes a quasi-resonant-mode selector configured to:
receive the first signal and the comparison signal;
if the output load is determined to be larger than the first load threshold in magnitude and the input signal is determined to be larger than the input threshold, generate the mode-selection signal corresponding to the first mode; and
if the output load is determined to be smaller than the first load threshold and larger than a second load threshold in magnitude, generate the mode-selection signal corresponding to the first mode; and
wherein:
the first mode is a valley switching mode;
the second mode is a continuous conduction mode; and
the first mode is different from the second mode;
wherein the operation-mode-selection component is further configured to:
process information associated with the first signal;
detect an end of a demagnetization period based at least in part on the first signal;
detect a first valley in the first signal, there being no other valley in the first signal between the end of the demagnetization period and the first valley; and
under the valley switching mode, in response to the first valley being detected in the first signal, change the drive signal from a first logic level to a second logic level in order to trigger a switching cycle of the power conversion system.

15. The system controller of claim 14 wherein the operation-mode-selection controller includes a continuous-conduction-mode selector configured to receive the first signal and the comparison signal and, if the output load is determined to be larger than the first load threshold in magnitude and the input signal is determined to be smaller than the input threshold, generate the mode selection signal corresponding to the second mode.

* * * * *